United States Patent
Rule

(10) Patent No.: US 10,865,369 B2
(45) Date of Patent: Dec. 15, 2020

(54) FERMENTATION METHODS

(71) Applicant: David D. Rule, Weiser, ID (US)

(72) Inventor: David D. Rule, Weiser, ID (US)

(73) Assignee: KILR-CHILR, LLC, Weiser, ID (US)

( * ) Notice: Subject to any disclaimer, the term of this patent is extended or adjusted under 35 U.S.C. 154(b) by 639 days.

(21) Appl. No.: 15/659,411

(22) Filed: Jul. 25, 2017

(65) Prior Publication Data

US 2017/0321174 A1    Nov. 9, 2017

Related U.S. Application Data

(62) Division of application No. 13/829,837, filed on Mar. 14, 2013, now abandoned, which is a division of application No. 11/657,957, filed on Jan. 23, 2007, now abandoned.

(51) Int. Cl.

| | |
|---|---|
| *C12G 1/02* | (2006.01) |
| *C12G 1/022* | (2006.01) |
| *B65D 88/34* | (2006.01) |
| *B65D 88/42* | (2006.01) |

(52) U.S. Cl.
CPC ............... *C12G 1/02* (2013.01); *B65D 88/34* (2013.01); *C12G 1/0203* (2013.01); *B65D 88/42* (2013.01)

(58) Field of Classification Search
CPC ... B65D 88/34–50; C12G 1/02; C12G 1/0203
USPC ......... 99/454, 453, 455, 456, 472, 277, 278, 99/276; 426/15, 231, 592, 599; 435/283.1–309.4; 220/216–219, 221, 220/222, 227
See application file for complete search history.

(56) References Cited

U.S. PATENT DOCUMENTS

| | | |
|---|---|---|
| 20,722 A | 6/1858 | Lyman |
| 348,115 A | 8/1886 | Egan |
| 1,338,129 A | 4/1920 | Fries et al. |
| 1,344,716 A | 6/1920 | Powell |
| 1,540,806 A | 8/1925 | Rohn |
| 1,561,769 A | 11/1925 | Ballew |
| 1,588,707 A | 6/1926 | Calga |
| 2,016,745 A | 10/1935 | Ireland |
| 2,035,213 A | 3/1936 | Anderson |
| 2,071,530 A | 2/1937 | Howard et al. |
| 2,153,335 A | 4/1939 | Martin |
| 2,167,160 A | 7/1939 | Raymond |

(Continued)

FOREIGN PATENT DOCUMENTS

| | | |
|---|---|---|
| CN | 2869694 Y | 2/2007 |
| CN | 203880986 | 12/2014 |

(Continued)

OTHER PUBLICATIONS

U.S. Appl. No. 11/433,323, filed May 11, 2006, Rule.

(Continued)

*Primary Examiner* — Ibrahime A Abraham
*Assistant Examiner* — John J Norton
(74) *Attorney, Agent, or Firm* — Wells St. John P.S.

(57) ABSTRACT

A fermentation method and system which includes providing juice to be fermented into a container. The juice having a cap that is a collection of solid components of grapes. The cap has a permeable consistency and floats in the juice. The method includes moving a portion of the juice from below the cap upward into contact with the cap.

15 Claims, 20 Drawing Sheets

(56) References Cited

U.S. PATENT DOCUMENTS

| | | |
|---|---|---|
| 2,193,318 A | 3/1940 | Floyd |
| 2,277,526 A | 3/1940 | Mojonnier et al. |
| 2,230,905 A | 2/1941 | Popky |
| 2,316,273 A | 4/1943 | Ludwig et al. |
| 2,333,751 A | 11/1943 | Turner |
| 2,339,228 A | 1/1944 | Wyllie |
| 2,356,779 A | 8/1944 | Morrison |
| 2,391,876 A | 1/1946 | Brown |
| 2,407,159 A | 9/1946 | Welton |
| 2,422,394 A | 6/1947 | Carter |
| 2,610,478 A | 9/1952 | Lofstedt |
| 2,662,749 A | 12/1953 | Buschow |
| 2,687,618 A | 8/1954 | Bergstrom |
| 2,715,627 A | 8/1955 | Mahltretter et al. |
| 2,751,672 A | 6/1956 | Reed |
| 2,813,026 A | 11/1957 | Adolphe |
| 2,847,193 A | 8/1958 | Carter |
| 2,874,629 A | 2/1959 | Kahan |
| 2,985,435 A | 5/1961 | Gross |
| 3,020,823 A | 2/1962 | Musso |
| 3,120,902 A | 2/1964 | Southworth et al. |
| 3,348,469 A | 10/1967 | Kasakoff |
| 3,425,488 A | 2/1969 | Jarreby |
| 3,458,917 A | 8/1969 | Mueller |
| 3,469,415 A | 9/1969 | Cornelius |
| 3,476,669 A | 11/1969 | Lanes |
| 3,482,625 A | 12/1969 | Bray |
| 3,484,212 A | 12/1969 | Cawi et al. |
| 3,545,475 A | 12/1970 | Johnson et al. |
| 3,565,168 A | 2/1971 | Powell et al. |
| 3,584,194 A | 6/1971 | Kautz et al. |
| 3,625,280 A | 12/1971 | Peter |
| 3,643,733 A | 2/1972 | Hall et al. |
| 3,693,825 A | 9/1972 | Richman |
| 3,814,003 A | 6/1974 | Vacano |
| 3,871,446 A | 3/1975 | Langenberg |
| 3,875,759 A | 4/1975 | Malcosky et al. |
| 3,965,894 A | 6/1976 | Vignal et al. |
| 4,002,111 A | 1/1977 | Pujol |
| 4,002,200 A | 1/1977 | Raskin |
| 4,036,699 A | 7/1977 | Quigg |
| 4,086,691 A | 5/1978 | Smith |
| 4,092,976 A | 6/1978 | Buckner |
| 4,120,425 A | 10/1978 | Bethurum |
| 4,146,089 A | 3/1979 | Mueller et al. |
| 4,148,355 A | 4/1979 | Gehring |
| 4,164,902 A | 8/1979 | Maarleveld |
| 4,179,902 A | 12/1979 | Mueller et al. |
| 4,206,237 A | 6/1980 | Sakata et al. |
| 4,212,950 A | 7/1980 | Adams |
| 4,216,659 A | 8/1980 | French |
| 4,250,954 A | 2/1981 | Remlinger et al. |
| 4,258,858 A | 3/1981 | Russel |
| 2,991,628 A | 7/1981 | Tuck |
| 4,305,458 A | 12/1981 | Jogand |
| 4,322,446 A | 3/1982 | Heess et al. |
| 4,329,433 A | 5/1982 | Seebeck et al. |
| 4,351,271 A | 9/1982 | Mueller et al. |
| 4,413,747 A | 11/1983 | Tenold et al. |
| 4,437,577 A | 3/1984 | Myers et al. |
| 4,487,785 A | 12/1984 | Epchtein |
| 4,496,446 A | 1/1985 | Ritter et al. |
| 4,498,446 A | 2/1985 | Judson |
| 4,503,988 A | 3/1985 | Gerber |
| 4,517,884 A | 5/1985 | Jandrich |
| 4,532,142 A | 7/1985 | Dean |
| 4,560,565 A | 12/1985 | Wucherpfennig et al. |
| 4,561,040 A | 12/1985 | Eastman et al. |
| 4,593,611 A | 6/1986 | Bruch |
| 4,593,612 A | 6/1986 | Rieger |
| 4,597,422 A | 7/1986 | Kovacevich |
| 4,633,678 A | 1/1987 | Lea et al. |
| 4,650,583 A | 3/1987 | Bondanini |
| 4,664,689 A | 5/1987 | Davis |
| 4,665,807 A | 5/1987 | Rieger |
| 4,671,329 A | 6/1987 | Kovacevich |
| 4,700,528 A | 10/1987 | Bernard |
| 4,708,938 A | 11/1987 | Hickinbotham |
| 4,710,292 A | 12/1987 | DeVos |
| 4,711,163 A | 12/1987 | Capuano |
| 4,711,785 A | 12/1987 | Bruch |
| 4,759,403 A | 7/1988 | Flint et al. |
| 4,790,238 A | 12/1988 | Hsu |
| 4,792,454 A | 12/1988 | Lemonnier |
| 4,814,189 A | 3/1989 | Laude-Bousquet |
| 4,829,782 A | 5/1989 | Mueller et al. |
| 4,856,421 A | 8/1989 | Whitford |
| 4,889,805 A | 12/1989 | Da Silva et al. |
| 4,908,219 A | 3/1990 | Modot et al. |
| 4,909,948 A | 3/1990 | Eichelberger, Sr. |
| 4,910,842 A | 3/1990 | Downing et al. |
| 4,969,391 A | 11/1990 | Haulot |
| 4,979,377 A | 12/1990 | Fievet et al. |
| 4,992,370 A | 2/1991 | Kalina |
| 5,027,971 A | 7/1991 | Perryman |
| 5,099,657 A | 3/1992 | Huang |
| 5,101,637 A | 4/1992 | Daily |
| 5,167,274 A | 12/1992 | Mueller |
| 5,173,318 A | 12/1992 | Leu et al. |
| 5,183,104 A | 2/1993 | Novotny |
| 5,212,090 A | 5/1993 | Landine et al. |
| 5,263,588 A | 11/1993 | Huburd et al. |
| 5,265,440 A | 11/1993 | Baker |
| 5,265,651 A | 11/1993 | Perkins et al. |
| 5,287,918 A | 2/1994 | Banks et al. |
| 5,365,830 A | 11/1994 | MacLennan et al. |
| 5,385,204 A | 1/1995 | Boardman et al. |
| 5,424,083 A | 6/1995 | Lozito |
| 5,427,276 A | 6/1995 | Knuettel et al. |
| 5,505,268 A | 4/1996 | Boardman et al. |
| 5,509,462 A | 4/1996 | Demko et al. |
| 5,564,589 A | 10/1996 | Hino |
| 5,802,863 A | 9/1998 | Cowans |
| 5,867,881 A | 2/1999 | Jalink et al. |
| 5,925,563 A | 7/1999 | Redford |
| 5,972,402 A | 10/1999 | Scholl et al. |
| 5,975,335 A | 11/1999 | Witenhafer |
| 6,125,736 A | 10/2000 | Marin |
| 6,182,454 B1 | 2/2001 | McNeilan |
| 6,252,018 B1 | 6/2001 | Rupaner |
| 6,279,457 B1 | 8/2001 | Francia |
| 6,328,184 B1 | 12/2001 | Krol |
| 6,387,624 B1 | 5/2002 | Horwell |
| 6,422,133 B1 | 7/2002 | Brady |
| 6,561,078 B1 | 5/2003 | Hughes |
| 6,622,615 B2 | 9/2003 | Heczko |
| 6,631,732 B1 | 10/2003 | Koster et al. |
| 6,668,915 B1 | 12/2003 | Materna |
| 6,702,002 B2 | 3/2004 | Wang |
| 6,703,055 B1 | 3/2004 | Klein et al. |
| 6,722,421 B2 | 4/2004 | MacKelvie |
| 6,805,885 B2 | 10/2004 | Francia |
| 6,877,504 B2 | 4/2005 | Schreff et al. |
| 6,964,223 B2 | 11/2005 | O'Loughlin |
| 7,353,750 B2 | 4/2008 | Francia |
| 7,685,715 B2 | 3/2010 | Rule |
| 7,870,891 B2 | 1/2011 | Rule |
| 1,145,915 A1 | 7/2015 | Marcuse |
| 9,920,289 B2 * | 3/2018 | Gentili ............ C12G 1/02 |
| 2001/0042443 A1 | 11/2001 | Francia |
| 2001/0050005 A1 | 12/2001 | Wang |
| 2002/0113072 A1 | 8/2002 | Lane |
| 2002/0174673 A1 | 11/2002 | Wilkinson |
| 2005/0224500 A1 | 10/2005 | Hebblethwaite |
| 2005/0274499 A1 | 12/2005 | Rule |
| 2005/0281911 A1 | 12/2005 | Del Monte et al. |
| 2007/0137494 A1 | 6/2007 | Wilhite |
| 2007/0264389 A1 | 11/2007 | Rule |
| 2008/0175951 A1 | 7/2008 | Rule |
| 2009/0301119 A1 | 12/2009 | Chen |
| 2011/0259321 A1 | 10/2011 | Lin |

(56) References Cited

U.S. PATENT DOCUMENTS

| | | | |
|---|---|---|---|
| 2012/0145095 A1 | 6/2012 | Nelson | |
| 2013/0008188 A1 | 1/2013 | McCormick | |

FOREIGN PATENT DOCUMENTS

| | | | | |
|---|---|---|---|---|
| DE | 19517937 | | 11/1996 | |
| EP | 0530820 A2 | * | 3/1993 | ............ C12M 41/40 |
| EP | 0737740 | | 10/1996 | |
| EP | 1229108 A1 | | 8/2002 | |
| EP | 1616937 | | 1/2006 | |
| FR | 2489709 | | 3/1982 | |
| FR | 2522677 A1 | | 9/1983 | |
| FR | 2627467 A1 | | 8/1989 | |
| FR | 2808282 A1 | | 11/2001 | |
| FR | 2892728 | | 5/2007 | |
| GB | 2121820 A | | 2/2007 | |
| WO | WO 8908698 | | 9/1989 | |
| WO | PCT/US07/0107671 | | 11/2008 | |
| WO | WO 2014/177187 | | 11/2014 | |
| WO | PCT/US2015/014516 | | 8/2017 | |

OTHER PUBLICATIONS

U.S. Appl. No. 11/657,957, filed Jan. 23, 2007, Rule.
WO PCT/US07/010767 Search Report, dated Sep. 16, 2006, Rule.
WO PCT/US07/010767 Written Opinion, dated Sep. 16, 2008, Rule.
PCT/US2015/014516 Srch Rpt., dated Oct. 27, 2015, Rule.
PCT/US2015/014516 Wtn. Opn., dated Oct. 27, 2015, Rule.
"Wine-Refrigeration", produced by Pasco Poly Tank—all updated articles from Pasco Polly's Winery News, edited by Lawrence Dawson, publication date unknown (11 pgs).
Amerine et al., "The Technology of Wine Making", The Avi Publishing Company Inc., 1972, pp. 364, 366 and 373-374.
Brewer, "What are Metals", Material Science and Technology Teachers Workshop, University of Illinois Champaign-Urbana, http://matse1.mse.uiuc.edu.
Webster's Third New International Dictionary of the English Language Unabridged p. 1579 vol. II H-R Encyclopedia Britannica, Inc.
Dennis Crouch, Patently-O, Jan. 22, 2014, What does it mean for a device to be "configured to" perform a particular function?

* cited by examiner

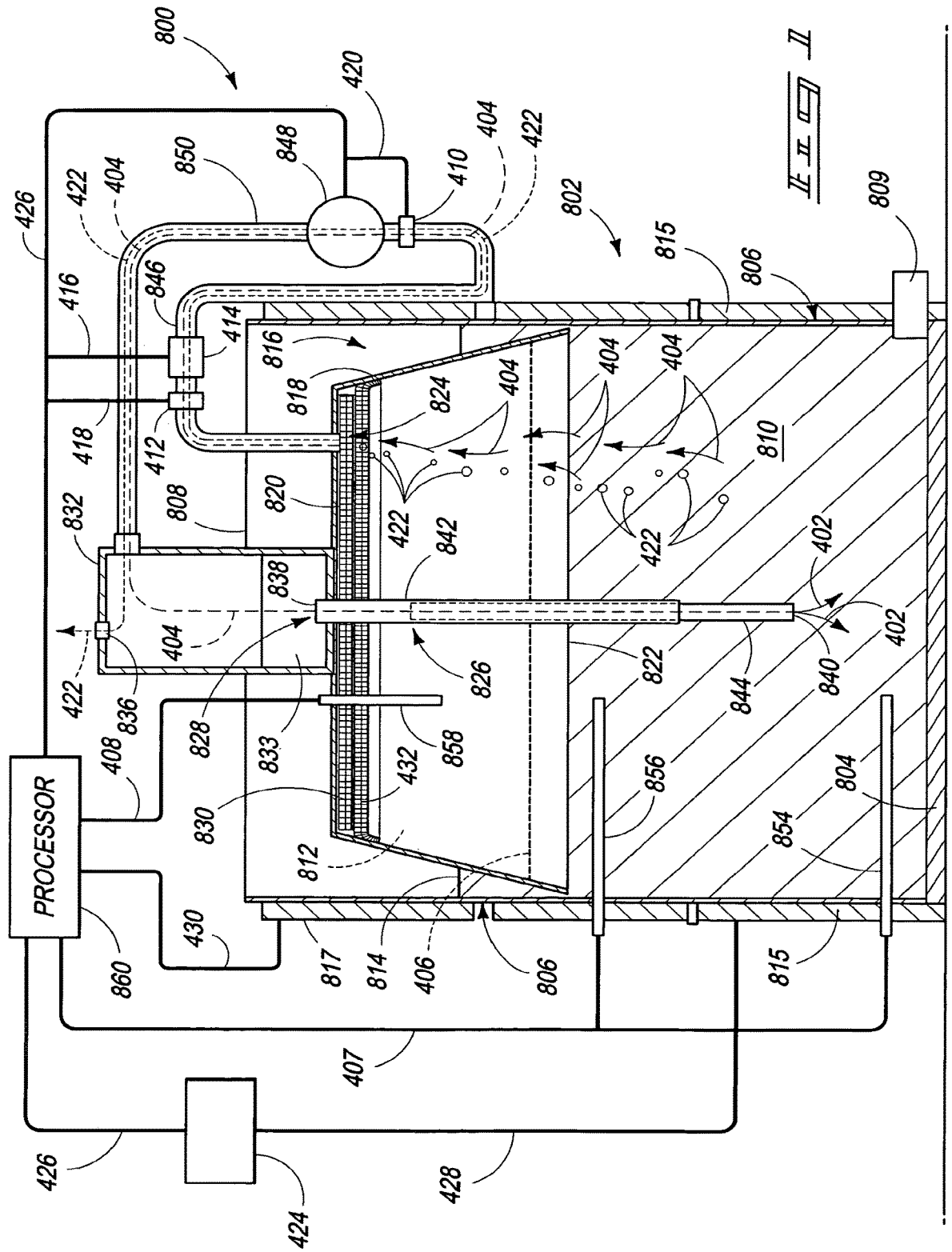

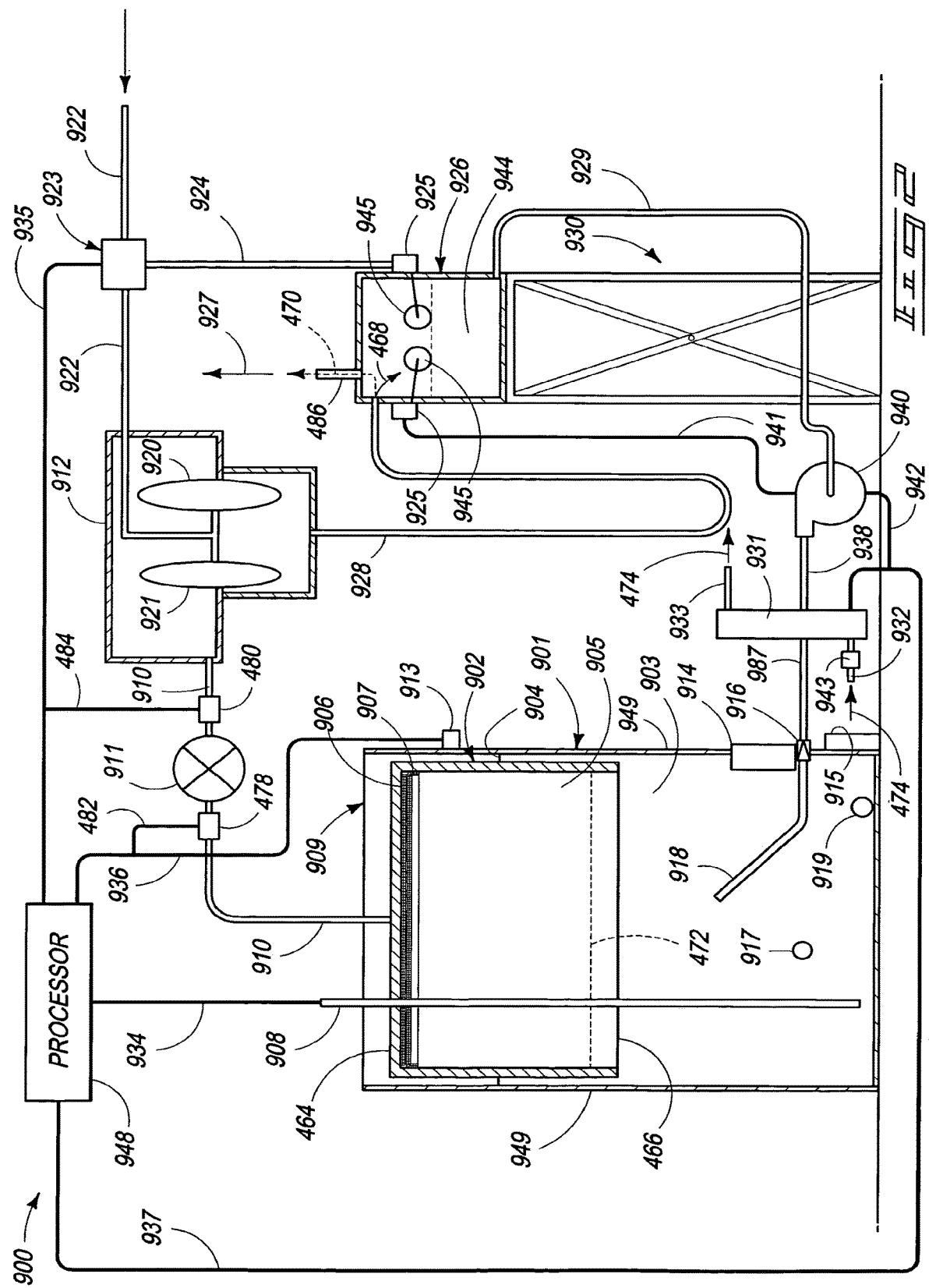

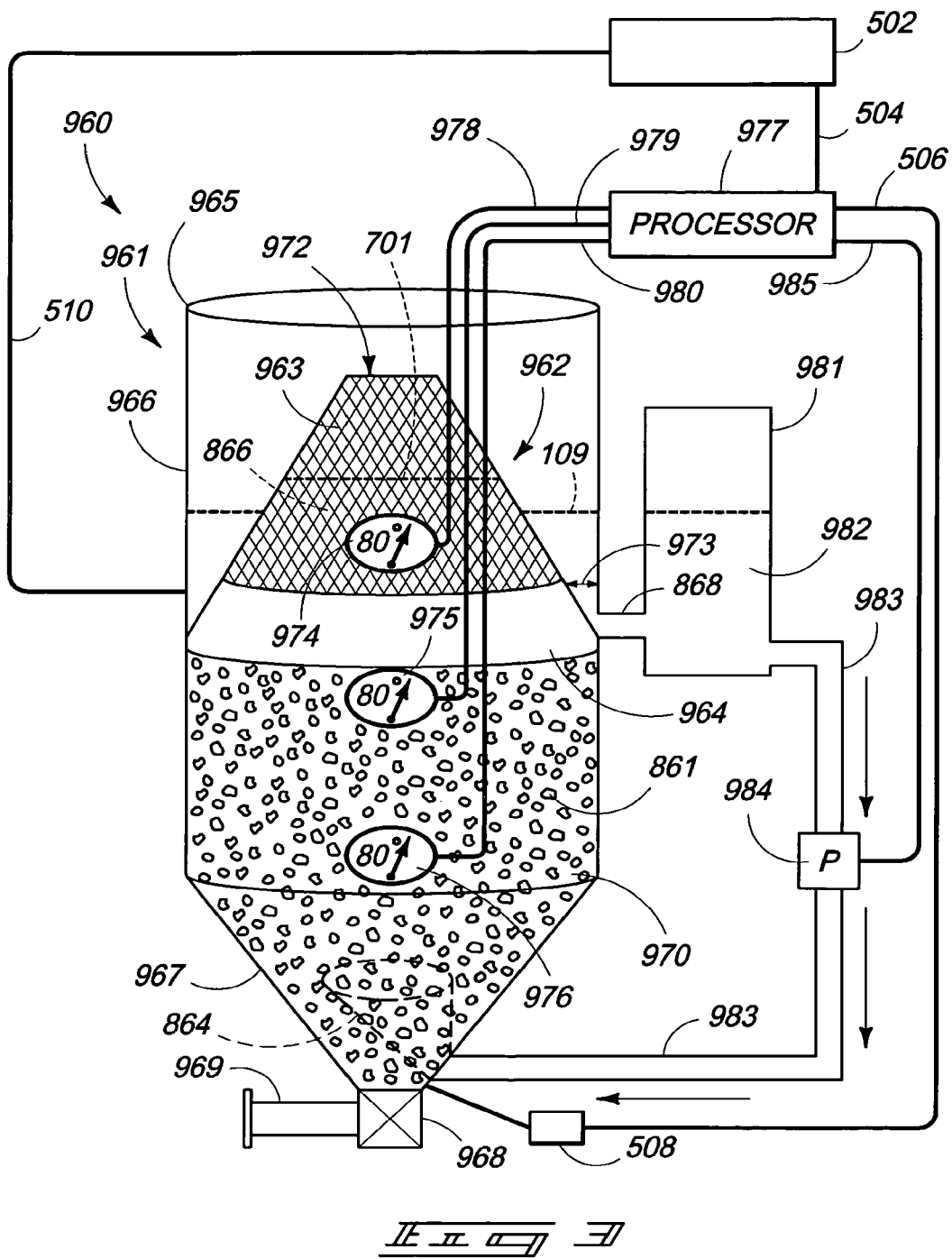

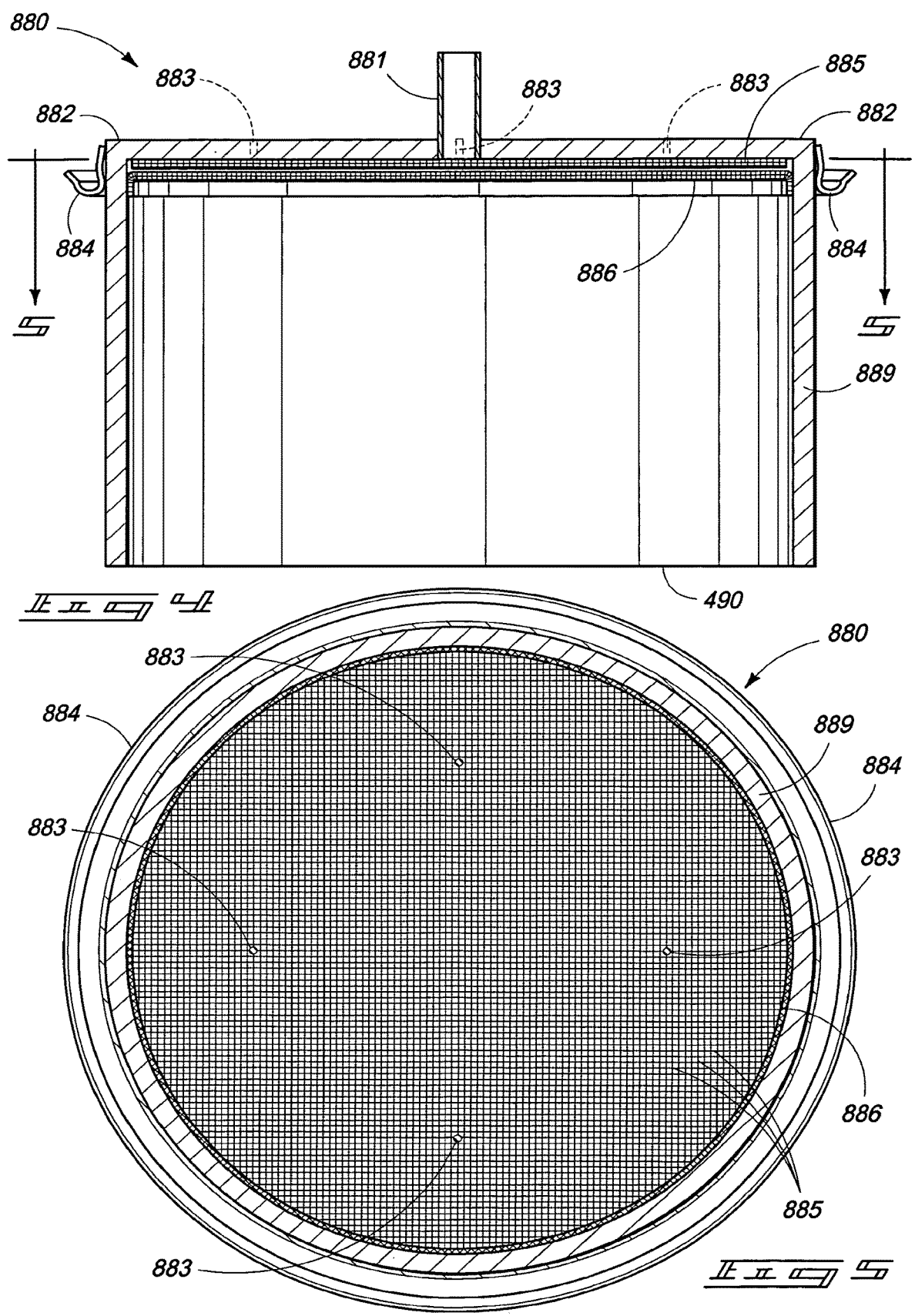

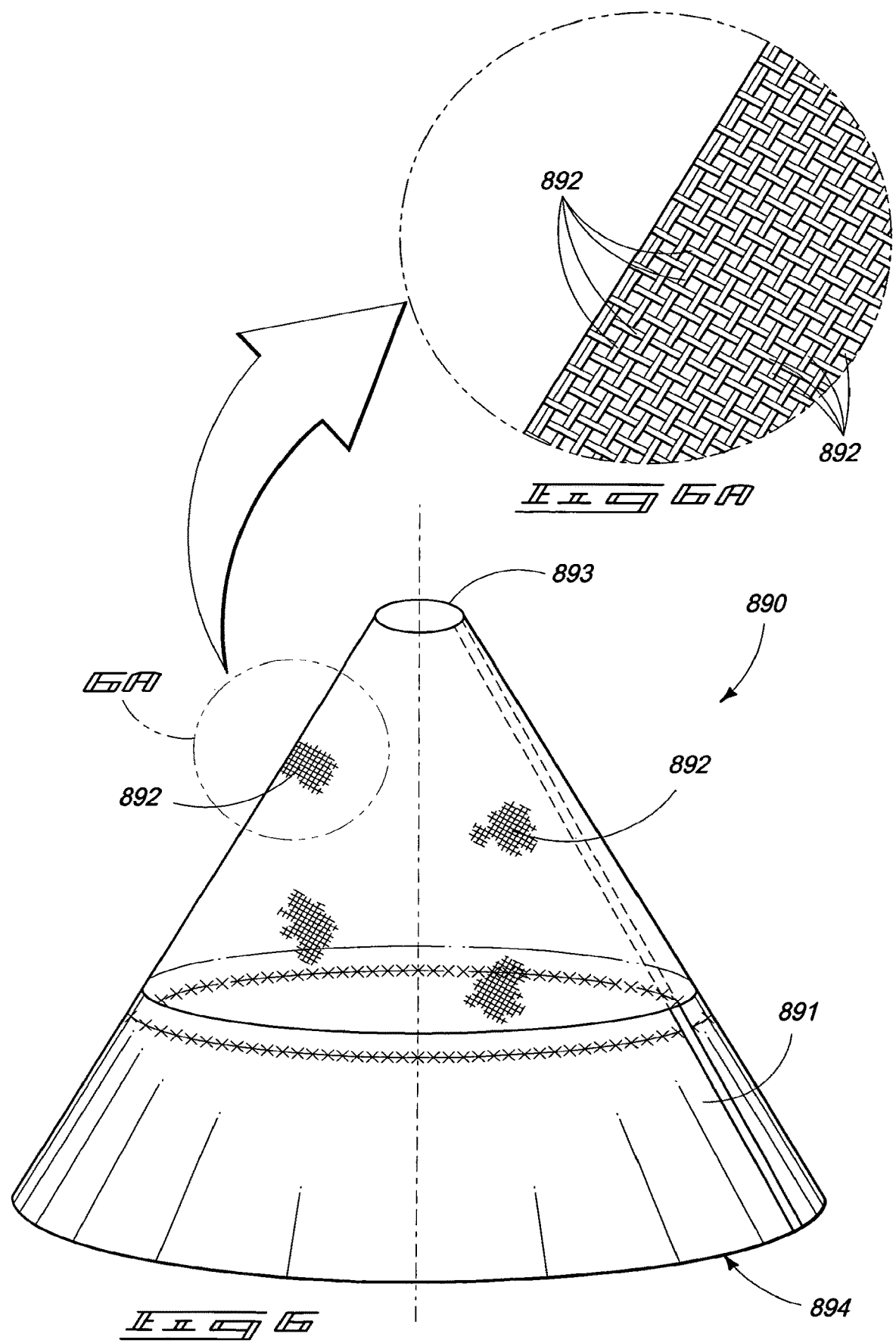

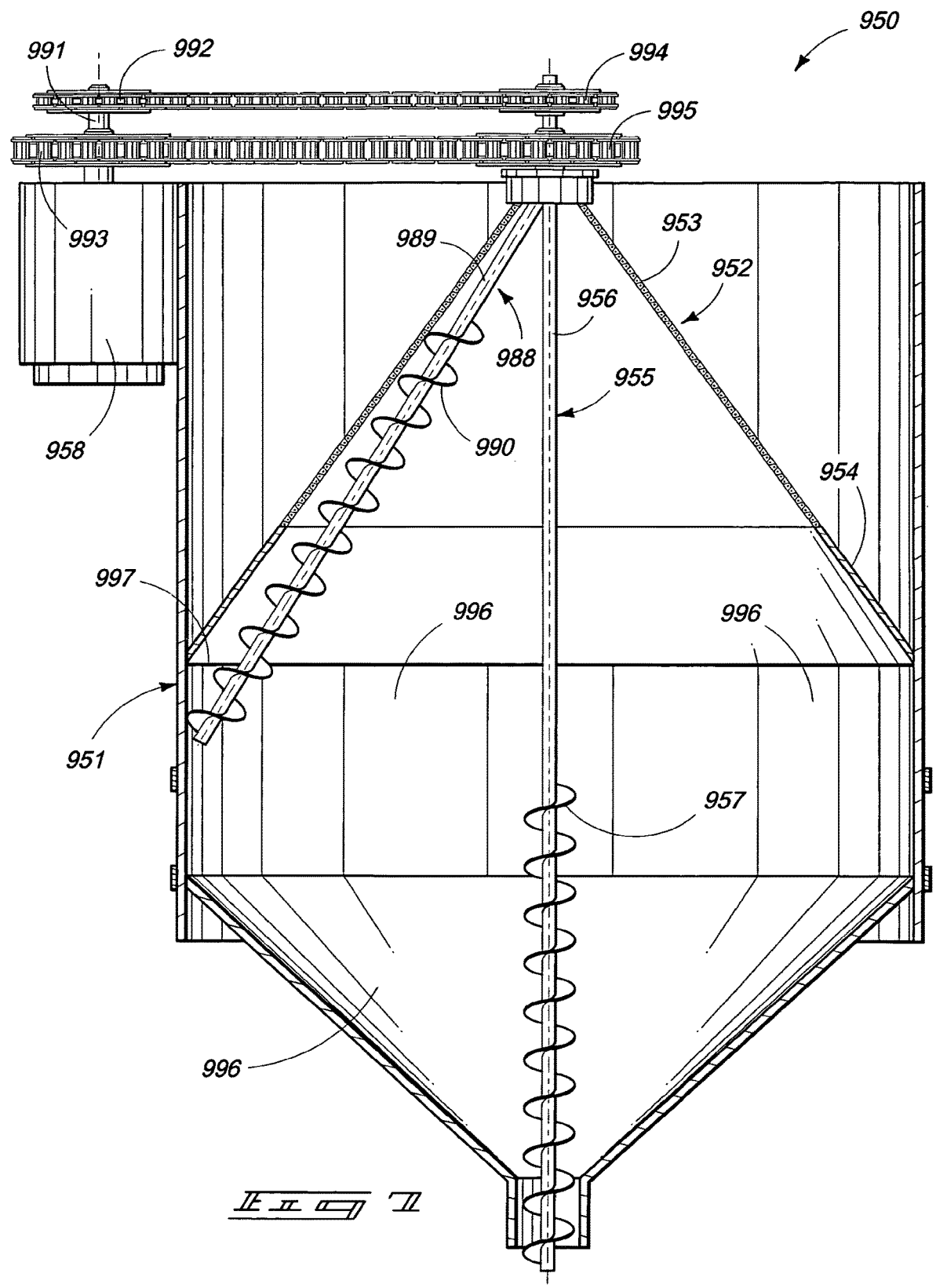

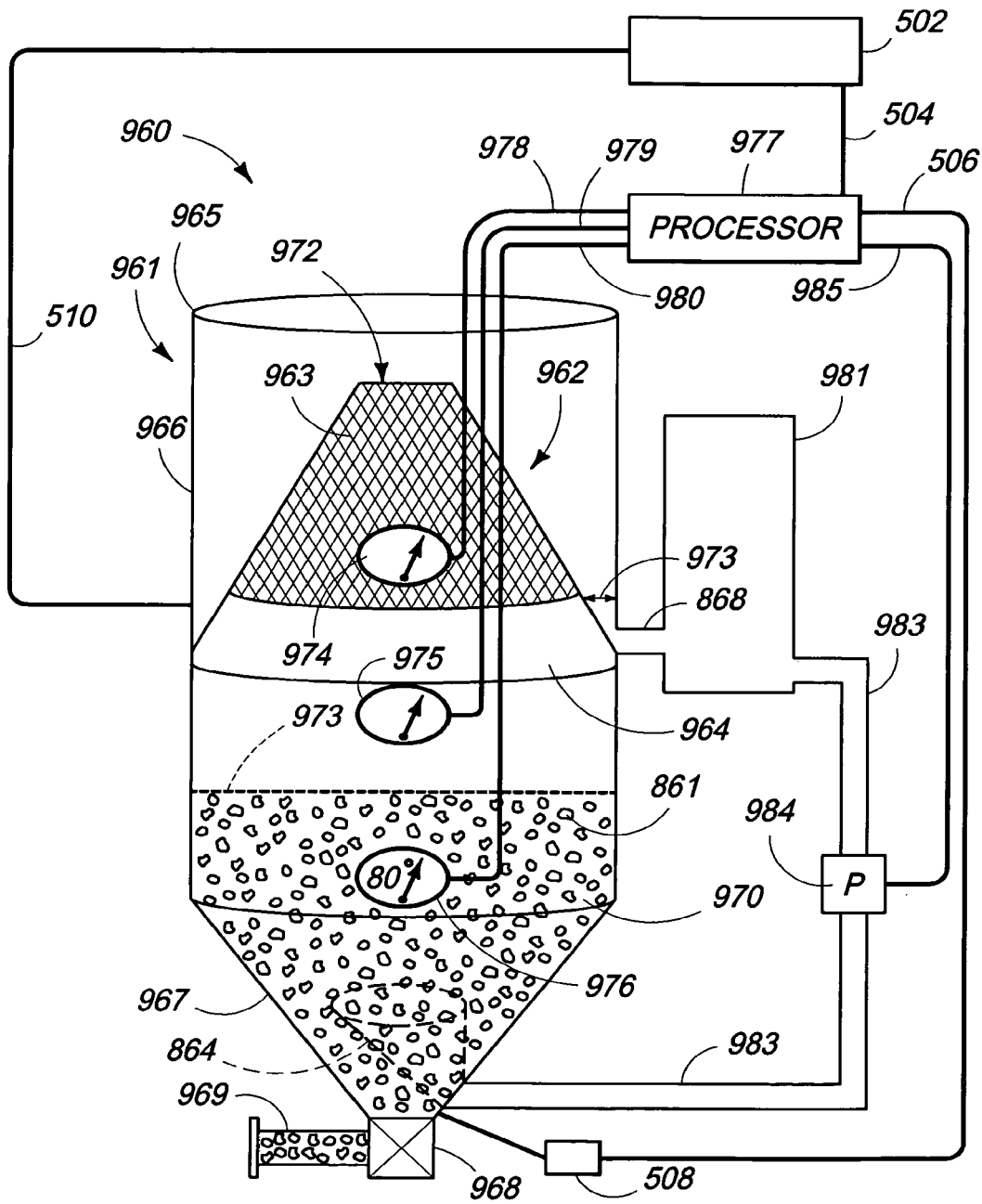

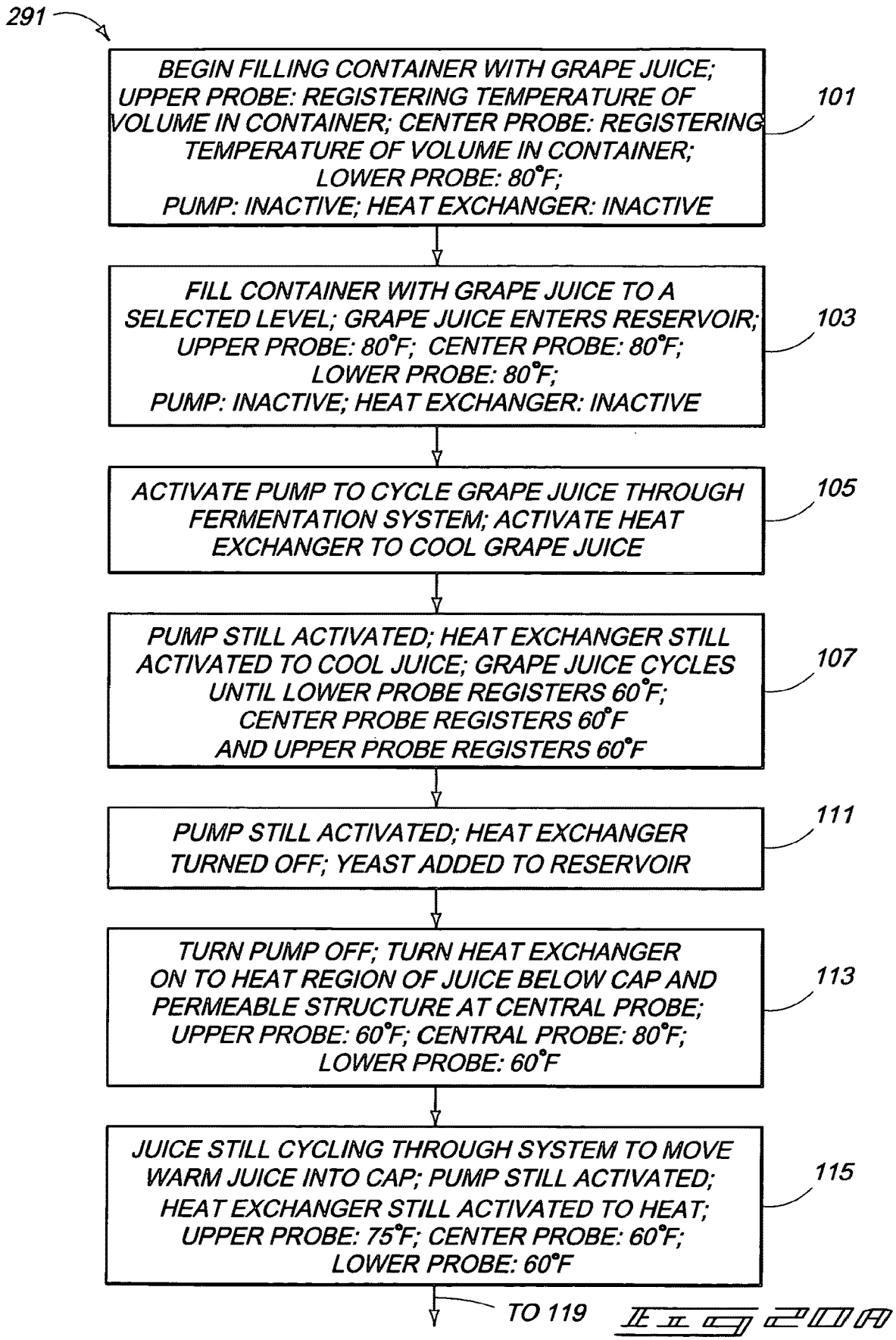

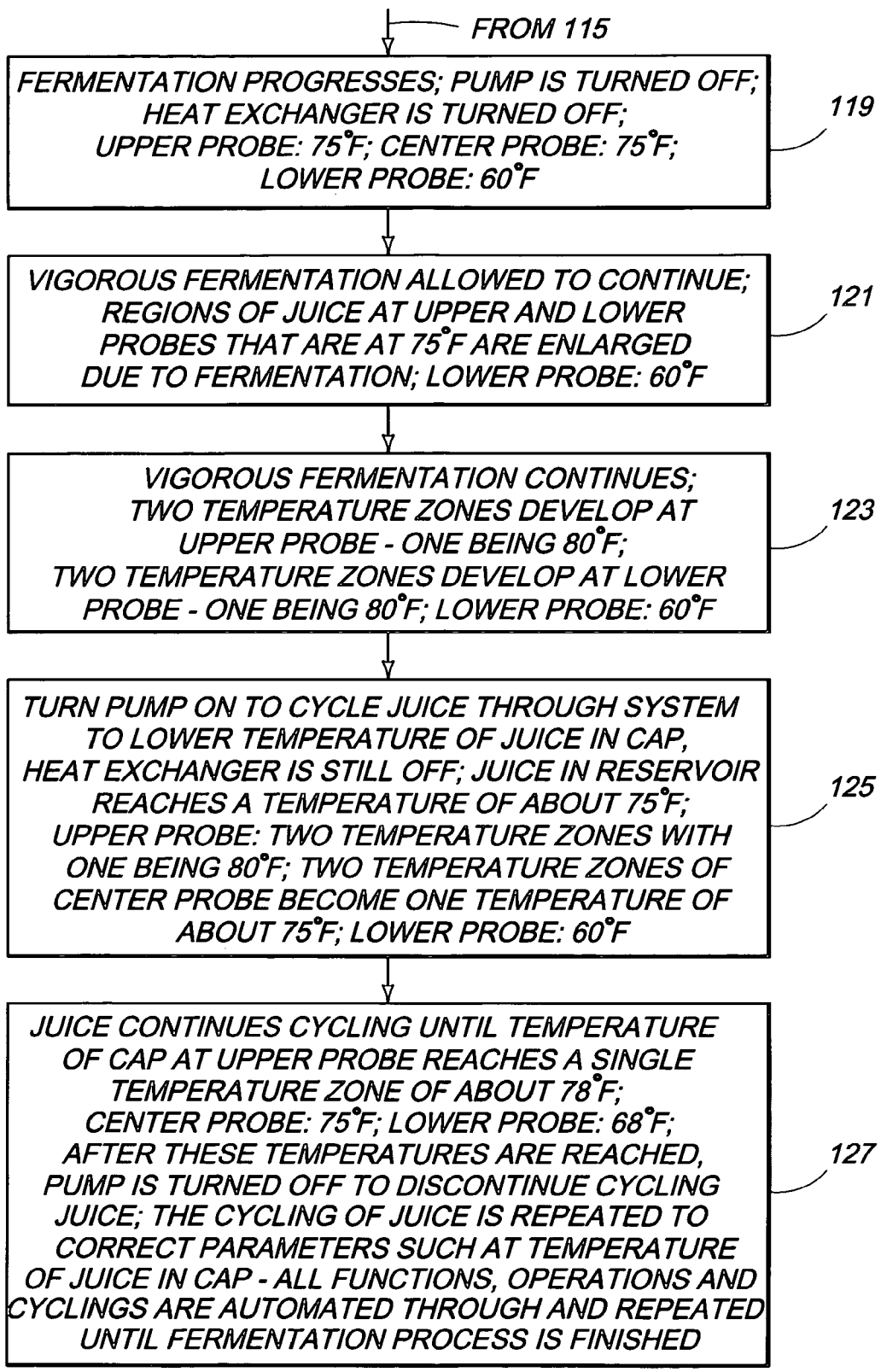

FERMENTATION METHODS

CROSS REFERENCE TO RELATED APPLICATION

This application is a division of and claims priority to U.S. patent application Ser. No. 13/829,837, filed Mar. 14, 2013, which was a division of and claims priority to U.S. patent application Ser. No. 11/657,957, filed Jan. 23, 2007, the disclosures of all are incorporated herein by reference.

TECHNICAL FIELD

The invention pertains to methods, apparatuses and systems of fermentation. The invention further pertains to methods, apparatuses and systems of fermenting juices.

BACKGROUND OF THE INVENTION

Fermentation is a process defined as a chemical breakdown of a substance by bacteria, yeasts, or other microorganisms. In the food industry, a simple definition of fermentation is the conversion of sugar to ethanol by using yeast. Ethanol is a form of alcohol, and is the alcohol in alcoholic beverages. Exemplary food industry products formed by fermentation include wine (converting juice into wine), beer (converting grains into beer), bread (converting carbohydrates into carbon dioxide to leaven the bread), and numerous other food products for the food industry.

It should be understood that all fermentation processes produce thermal energy during the chemical breakdown of the substance, whether by using bacteria, yeasts, or other micro-organisms. Accordingly, fermentation is a heat source process wherein the chemical breakdown of the substance releases heat. However, fermentation occurs only within a specific range of temperatures and chemical conditions. Consequently, for the fermentation process to begin and continue, the temperature of the material to be fermented must be in a specific range of temperatures for the fermentation process to progress. If the temperature of the material to be fermented changes to a temperature value outside the specific temperature range, the fermentation process chemically changes, and ultimately the fermentation ceases, both of which are routinely detrimental to the final product. Moreover, the desired characteristics of the product being produced by the fermentation process are optimized if the process is maintained within a specific temperature range. Therefore, controlling and maintaining the temperature of the material during the process is important to continue the process and optimize the characteristics of the final product being produced.

Moreover, gases develop during the fermentation process, and a majority of the gases are detrimental or toxic to the fermentation process. Accordingly, controlling the concentration of gases during the fermentation process, for example carbon dioxide, is important to optimize the characteristics of the final product being produced.

Additionally, an exemplary fermentation process is performed to produce wine. Generally stated, fruit juice is provided in a container or tank and yeast is added to the fruit juice to begin the fermentation process. The yeast reacts with the sugar in the fruit juice to produce wine, carbon dioxide ($CO_2$) gas and thermal energy as heat. The most common fruit used to produce wine is grapes. Some varieties of wine rely on a process of having solid components or portions of the grapes (skins, seeds, pulp and stems) soaking in the grape juice during fermentation to provide the character and quality of the finished wine product. That is, for these particular varieties of wine, the solid components create the final wine product, and establish the quality thereof, through the extraction and release of substances (chemicals or chemistries) from the solid components (particularly the skins) into the grape juice. The solid components of the grapes collect together during the fermentation process which can be referred to as a cap. The cap can include skins, seeds, pulp and stems. However, the stems are routinely removed before the fermentation process begins.

To optimize the wine varieties which rely on the cap during the fermentation process, an ideal goal is to continually move the volume of grape juice to be in contact with a maximum surface area of the cap during fermentation. However, the cap forms a compact collection of the solid components or material within the grape juice which generally floats in the grape juice during fermentation. The compactness of the cap becomes impenetrable during the fermentation. Accordingly, optimizing the quality of the final wine product is difficult. Moreover, a portion of the cap is routinely extending elevationally above an upper surface of the grape juice during floatation, and therefore, that portion of the cap does not contact the grape juice to release its beneficial chemistry into the juice. Moreover, the portion of the cap elevationally above the juice will tend to dry out which can release a different chemistry into the juice that is detrimental to the final product being produced. These problems impede the goal of maximizing a volume of the cap coming in contact with a maximum volume of grape juice which optimizes release of the beneficial chemistry into the juice during fermentation.

The wine industry attempts to resolve these problems by performing several different methods. One method includes various forms of "plunging" or "punching down" actions by individuals wherein the plunging or punching down of the cap moves the cap below the upper surface of the grape juice. That is, the goal is to submerge an entirety of the cap within the grape juice. Another method includes various forms of "spraying over" or "pumping over" actions wherein the grape juice is distributed or sprayed over the cap during fermentation. The ineffectiveness of these alleged corrective methods are disclosed in U.S. Pat. No. 6,125,736 to Marin. For example, the plunging down method promotes disintegration of the cap within the grape juice which "generates an undesired quantity of dregs" being formed in the grape juice (Marin at col. 1, line 47 to col. 2, line 19). "Dregs may give rise to undesirable tastes and require further operations for subsequent cleaning of the wine." (Marin at col. 2, lines 19-22). Furthermore, the plunging down or punch down method is manually performed which makes the method labor intensive, expensive, inexact and additionally, undesirably exposes the surface of the grape juice to oxygen.

Regarding the "pumping over" method, such relies on gravity to move the grape juice through the cap. That is, the force or weight of a stream of juice is relied upon to force the juice through the compact cap. Gravity is not sufficient to move the juice through a substantially portion of the cap due to the compactness of the cap, and therefore, the penetration is minimal. Only a limited number of paths develop through the cap to allow the grape juice to pass or flow. Moreover, the fermentation process produces carbon dioxide that bubbles up from below the cap to further impede the juice moving to pass through the cap from the top (see, for example, Marin at col. 2, lines 26-32). Consequently, the grape juice simply flows through the same few paths of the cap which developed during a previous pump over action, and therefore, the same volume of the cap is being contacted by the juice. Accordingly, this portion of the cap has already released their beneficial chemistries into the grape juice. That is, subsequently spraying or pumping over the cap is providing a minimal benefit. Additionally, other portions of the cap which are still rich in the beneficial chemistries do not come in contact with the grape juice to release their beneficial chemistries.

Some alleged corrective methods include a combination of the "pumping over" and "punching down." However, this simply means that a combination of the problems discussed above now exist during the fermentation. Accordingly, the alleged corrective methods of "pumping over" and "punching down" are ineffective for optimizing cap contact with the juice during fermentation, and therefore, the quality of the wine greatly suffers.

Moreover, as suggested previously, these alleged resolutions are "labor intensive" requiring extensive man hours. Accordingly, these methods are expensive, and more problematic, inexact. That is, being labor intensive, there is no systematic monitoring and controlling of the fermentation process. The industry does not understand how quickly the fermentation process can get out of control and how drastically the process can be removed from an optimal process. Accordingly, a system or method to quickly address and resolve problems that develop during the fermentation process does not exist.

Still further, the methods that rely on pumping over and plunging actions do not address the fact that the actions can crush or crack open solid components of the cap which can release detrimental chemistries into the juice. For example, the pumps used in these methods routinely receive solid components of the grapes such as seeds that cause the pumps to malfunction and release the detrimental chemistries into the juice.

Accordingly, there is a need to provide fermentation systems that have the capability to monitor and quickly address problems that develop during the fermentation process. For example, monitoring and quick control and adjustment of temperature of the material being fermented is needed. Moreover, there is a need to provide and develop the capability to control and adjust the concentration of gases produced during the fermentation process. Additionally, there is a need to provide and develop the capability to optimize the grape juice contact with the cap during the fermentation process. Furthermore, there is a need to automate the fermentation process thereby doing away with the expense and inexactness of using labor intensive methods during the fermentation process.

BRIEF DESCRIPTION OF THE DRAWINGS

Preferred embodiments of the invention are described below with reference to the following accompanying drawings.

FIG. 1 is a vertical cross-sectional view of an exemplary fermentation system according to one of various embodiments of the invention.

FIG. 2 is a vertical cross-sectional view of an exemplary fermentation system according to another of various embodiments of the invention.

FIG. 3 is a vertical cross-sectional view of an exemplary fermentation system according to still another of various embodiments of the invention.

FIG. 4 is a vertical cross-sectional view of an exemplary housing assembly according to one of various embodiments of the invention.

FIG. 5 is a horizontal cross-sectional view of the housing assembly of FIG. 4 taken along line 5-5.

FIG. 6 is a perspective view of an exemplary permeable structure according to one of various embodiments of the invention.

FIG. 6A is a fragmentary view of FIG. 6.

FIG. 7 is a vertical cross-sectional view of an exemplary fermentation apparatus according to one of various embodiments of the invention.

FIG. 8 illustrates a method of using the exemplary fermentation system of FIG. 3 according to one exemplary step of various embodiments of the invention.

FIGS. 20A-B illustrate an exemplary flow chart according to one of various embodiments of the invention that corresponds to the method steps of FIGS. 8-19.

SUMMARY OF THE INVENTION

Figure 9:
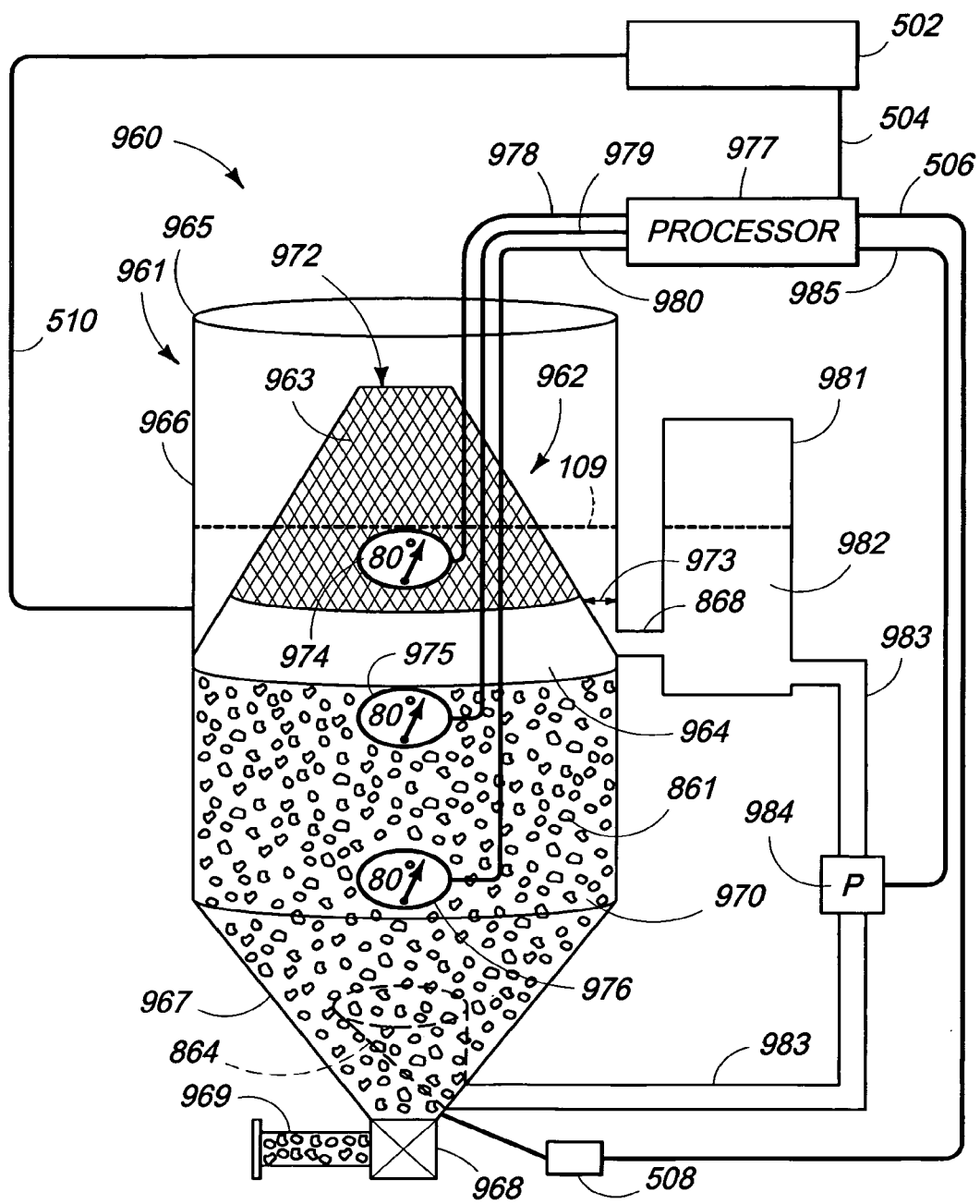
FIG. 9 illustrates an exemplary step subsequent to the FIG. 8 method according to one of various embodiments of the invention.

One aspect of the invention includes a fermentation method of providing a container having grape juice to be fermented. The grape juice comprises a cap. The cap comprises a collection of solid components of grapes and has a permeable consistency. The cap floats in the grape juice. The method further includes moving a portion of the grape juice from below the cap upward into contact with the cap.

Another aspect of the invention includes a fermentation method of providing a container having grape juice to be fermented. The grape juice comprises a cap. The cap comprises a collection of grape components having a permeable consistency and floating in the grape juice. The method further includes determining a temperature of the cap. If the temperature of the cap passes a threshold value, adjusting the temperature of the cap.

Still another aspect of the invention includes a fermentation system. The system comprises a container defining a volume to receive material to be fermented. A pump is in fluid communication with a fluid region inside the container above the material and configured to establish a vacuum above the material which produces a fluid pressure differential throughout the container.

DETAILED DESCRIPTION OF THE PREFERRED EMBODIMENTS

This disclosure of the invention is submitted in furtherance of the constitutional purposes of the U.S. Patent Laws "to promote" the progress of science and useful arts" (Article 1, Section 8).

The following various embodiments of the invention are directed to discussions and descriptions of fermentation methods and systems directed to fermenting fluids. However, it should be understood that various embodiments of the invention are applicable to fermenting substances or materials other than fluids.

FIG. 1 illustrates an exemplary one of various embodiments of the invention directed to a fermentation system 800. Fermentation system 800 comprises a vessel, container, tank and/or vat to hold a material to be fermented. One exemplary embodiment of the invention relies on a vat 802 to hold an exemplary material to be fermented, for example, a fluid. In one embodiment, vat 802 comprises a sidewall 806 extending between a bottom wall 804 and an open top or upper rim 808 opposite the bottom wall 804. The exemplary vat 802 has an inside volume for receiving material to be fermented.

An exemplary one of the various embodiments of the fermentation system 800 includes a medium 815 provided on or over sidewall 806 of vat 802. An exemplary medium 815 comprises a vibrational medium and/or a cooling and heating medium, and any combination thereof. An exemplary vibrational medium comprises a wave forming device, for example an ultrasonic transducers, for producing and transmitting wave energy through sidewall 806 and into material in vat 802. An exemplary use of the wave energy is to agitate, mix, stir and/or loosen material in vat 802. An exemplary cooling and heating medium comprises a structure portion of a heating and cooling apparatus described more thoroughly subsequently.

An exemplary one of the various embodiments of the fermentation system 800 includes an insulating and/or a dampening material 817 provided on or over sidewall 806 of vat 802. Insulating and/or a dampening material 817 communicates with a processor 860 via pathway 430. An exemplary dampening material 817 includes foam materials, bulk materials, rubber materials, clay materials, mastic materials and/or metal materials, or any combination of the various materials. An exemplary purpose for dampening material 817 is to limit or impede wave energy and noise escaping to the environment which are created by an exemplary vibrational medium 815.

At least one access opening 809 is formed in sidewall 806 to allow access to the inside volume of vat 802 and is plugged during use of vat 802. The horizontal cross-sectional configuration of vat 802 can have any configuration imaginable, for example, a square, a rectangle, a hexagon, an octagon, an oval, a trapezoid, a parallelogram, and any other configuration devoid of symmetry. In one embodiment of the invention, the horizontal cross-sectional configuration of vat 802 includes a circle wherein sidewall 806 is configured as a cylinder.

In one embodiment of the invention, the material to be fermented is fruit juice, for example grape juice 810, which is to be fermented into wine. In another of various embodiments of the invention, the grape juice 810 will include a cap 812 during the fermentation process. The cap 812 comprises at least one of grape skins, grape seeds, grape pulp, grape stems, oak wood chips and rice hulls, and any combination of these materials or ingredients. Moreover, any combination for cap 812 includes any percentage of one of grape skins, grape seeds, grape pulp, grape stems, oak wood chips and rice hulls relative the entire combination, or relative any percentage of one of the other of grape skins, grape seeds, grape pulp, grape stems, oak wood chips and rice hulls. In one of various embodiments of the invention, cap 812 will substantially include grape skins and grape seeds. It should be understood that the consistency of cap 812 varies between substantially lacking a cohesiveness (that is, not packed together substantially) to being so densely compacted that cap 812 comprises only minimal permeability.

It should be further understood, in conventional fermentations systems, a cap will float in the grape juice with an exposed portion of cap extending elevationally above an upper surface of the grape juice. The exposed portion of the cap above juice is not contacting the grape juice, and therefore, no benefit to the fermenting process. Moreover, the exposed portions of cap can diminish the permeability of the cap and conditions in the cap become stale.

However, still referring to FIG. 1, fermentation system 800 according to the invention will routinely have cap 812 substantially submerged in the grape juice 810. An exemplary fermentation system 800 according to the invention comprises an apparatus or device referenced as housing assembly 816 positioned over cap 812. In one exemplary embodiment of the invention, housing assembly 816 is an inverted bucket or container having an upper wall 820. It should be understood that in an exemplary embodiment of the invention, juice 810 substantially fills housing assembly 816 and substantially covers cap 812 having a lowermost surface 406. An uppermost surface of cap 812 can be at any level within housing assembly 816 and includes being positioned proximate permeable membranes 432 and 830 described subsequently. Accordingly, cap 812 is substantially immersed in juice 810 even though an upper surface 814 of juice 810 outside of housing assembly 816 is elevationally below an upper wall 820 of housing assembly 816.

An exemplary housing assembly 816 according to one of various embodiments of the invention comprises a sidewall 818 that extends downward from upper wall 820 to terminate and form or define a peripheral rim 822. The horizontal cross-sectional configuration of housing assembly 816 can be any configuration imaginable and is configured to fit inside vat 802 and over cap 812. That is, housing assembly 816 is configured for sliding engagement along a vertical axis within the volume of vat 802 while remaining over at least a portion of cap 812. Moreover, the vertical and horizontal cross-sectional configurations of housing assembly 816 can be any configuration imaginable. An exemplary vertical cross-sectional configuration of a trapezoid is illustrated. The vertical movement of housing assembly 816 means it can move between being proximate upper rim 808, elavationally above upper rim 808, and elavationally below upper rim 808 and proximate bottom wall 804. In one embodiment of the invention, housing assembly 816 comprises a horizontal cross-sectional dimension that is approximately two inches less than a horizontal cross-sectional dimension of vat 802.

An exemplary housing assembly 816 has a first aperture 828 and a second aperture 824, both formed in upper wall 820. First aperture 828 will receive tube 826 discussed below. Second aperture 824 will receive gases 422 and juice 810 moving in direction 404, both moving through second aperture 824 into first conduit 846. In an exemplary embodiment of housing assembly 816 according to the invention, housing assembly 816 comprises a single composition of material such as plastic and/or metal, and any composition of various materials. Such exemplary various materials include polymers, plastics, fiberglass, metals, stainless steel and polyethylene.

Still referring to FIG. 1, housing assembly 816 of fermentation system 800 comprises at least one permeable membrane or porous device. An exemplary housing assembly has a first permeable or porous membrane 432 below or under a second permeable or porous membrane 830. Each exemplary first and second permeable membranes 432 and 830 comprise a filter, mesh and/or screen, or similar porous structure. Additionally, exemplary first and second permeable membranes 432 and 830 comprise any structure relative each other, for example, the same structures wherein each is a filter. Alternatively, exemplary first and second permeable membranes 432 and 830 comprise different structures relative each other, for example, first permeable membranes 432 comprises a filter and second permeable membranes 830 comprises a mesh, or any of various combinations thereof.

Exemplary first and second permeable membranes 432 and 830 comprise any composition of material such as plastic and/or metal, and any composition of various materials. Exemplary first and second permeable membranes 432 and 830 can comprise the same composition, such as metal. Exemplary various materials for exemplary first and second permeable membranes 432 and 830 include polymers, plastics, fiberglass, metals, papers, stainless steel and polyethylene. Exemplary first and second permeable membranes 432 and 830 can comprise different compositions relative each other, for example, first permeable membranes 432 comprises metal and second permeable membranes 830 comprises plastic, or any of various combinations thereof.

Exemplary first and second permeable membranes 432 and 830 each have openings configured and sized to prevent penetration of solid components of cap 812 (for example, grape skins, grape seeds, grape pulp and/or grape stems). In one of various exemplary embodiments according to the invention, each exemplary first and second permeable membranes 432 and 830 has the same dimensioned or sized holes or openings and the same configuration of holes relative the other. In one of various exemplary embodiments according to the invention, exemplary first and second permeable membranes 432 and 830 have differently dimensioned holes or openings relative the other, and alternatively, the same dimensioned holes or openings relative each other. In one of various exemplary embodiments according to the invention, exemplary first and second permeable membranes 432 and 830 have differently configured holes or openings relative each other, and alternatively, the same configuration of holes or openings relative each other. In one of various exemplary embodiments according to the invention, exemplary first and second permeable membranes 432 and 830 have differently dimensioned holes or openings relative the other and the same configuration of holes or openings relative each other. Alternatively, exemplary first and second permeable membranes 432 and 830 have the same dimensioned holes or openings relative the other and the differently configured holes or openings relative each other, or any of various combinations thereof.

In one of various exemplary embodiments according to the invention, exemplary first permeable membrane 432 has smaller dimensioned openings than the dimensions of the openings for second permeable membrane 830. Exemplary diameter dimensions for openings of first permeable membrane 432 range from about 0.01 inch to about 0.5 inch with an exemplary diameter dimension being about 0.06 inch. Exemplary diameter dimensions for openings of second permeable membrane 830 range from about 0.09 inch to about 1 inch with an exemplary diameter dimension being about 0.2 inch. An exemplary first permeable membrane 432 can be referred to as a filter screen. An exemplary second permeable membrane 830 can be referred to as a spacer screen and additionally functions as a spacer for filter screen 432 relative upper wall 820 of housing assembly 816.

An exemplary spacer screen 830 has horizontal cross-sectional dimensions that equal the horizontal cross-sectional dimensions of housing assembly 816. Alternatively, an exemplary spacer screen 830 has horizontal cross-sectional dimensions that are less than the horizontal cross-sectional dimensions of housing assembly 816. Alternatively, an exemplary spacer screen 830 has horizontal cross-sectional dimensions that are greater than the horizontal cross-sectional dimensions of housing assembly 816. An exemplary spacer screen 830 has horizontal cross-sectional dimensions that are about 4.0 inches less than the horizontal cross-sectional dimensions of housing assembly 816. In this exemplary embodiment, the spacer screen 830 can be arranged in any manner relative the horizontal cross-sectional dimension of housing assembly 816. For example, spacer screen 830 can be centered leaving about two inches spacing between opposite ends of spacer screen 830 and sidewall 818 of housing assembly 816.

An exemplary filter screen 432 has horizontal cross-sectional dimensions that equal the horizontal cross-sectional dimensions of housing assembly 816. Alternatively, an exemplary filter screen 432 has horizontal cross-sectional dimensions that are less than the horizontal cross-sectional dimensions of housing assembly 816. Alternatively, an exemplary filter screen 432 has horizontal cross-sectional dimensions that are greater than the horizontal cross-sectional dimensions of housing assembly 816. An exemplary filter screen 432 has horizontal cross-sectional dimensions that are greater than the horizontal cross-sectional dimensions of housing assembly 816 wherein opposite ends are curved along sidewall 818 of housing assembly 816. In one exemplary embodiment of the invention, opposite ends of filter screen 432 are curved downwardly along sidewall 818 of housing assembly 816. Alternatively, opposite ends of filter screen 432 can be curved upwardly along sidewall 818 of housing assembly 816, and further alternatively, both opposite ends can be curved in both directions, that is, downwardly and upwardly along sidewall 818 of housing assembly 816. Still further, one opposite end of filter screen 432 can be curved upwardly along sidewall 818 and the other opposite end of filter screen 432 can be curved downwardly along sidewall 818.

Exemplary filter and spacer screens 432 and 830 are positioned between cap 812 and upper wall 820 of housing assembly 816. In one embodiment of the invention, filter and spacer screens 432 and 830 are secured to housing assembly 816. For an alternative embodiment, filter and spacer screens 432 and 830 are not secured to any structure. Still alternatively, one of filter and spacer screens 432 and 830 is secured to housing assembly 816 and the other of filter and spacer screens 432 and 830 is not secured to housing assembly 816. Exemplary housing assembly 816 has a flexible seal, for example, similar to flexible seal 884 of FIGS. 4-5 described subsequently. The exemplary flexible seal extends between housing assembly 816 and vat 802 between respective sidewalls 818 and 806.

Still referring to FIG. 1, fermentation system 800 comprises a reservoir 832. Reservoir 832 is positioned proximate an upper surface of the upper wall 820 of housing assembly 816 and has an opening aligned with the first aperture 828 of housing assembly 816. Reservoir 832 is configured with an inner volume to receive portions of juice 810 from vat 802, referenced as juice 833, and to receive gases 422 from vat 802 created by the fermentation process. An exemplary inner volume of reservoir 832 comprises a range of approximately 10% to approximately 20% of volume of vat 802.

According to one of various embodiments, reservoir 832 has an end secured to the upper wall 820 of housing assembly 816. Reservoir 832 has an enclosed end opposite housing assembly 816 and is illustrated positioned elevationally above upper rim 808 of vat 802. An exemplary embodiment of reservoir 832 has the enclosed end forming an orifice 836 to allow gases 422 to escape reservoir 832, and such orifice 836 can be fitted with a removable plug to fluidly seal the enclosed end of reservoir 832. For one of various embodiments of the invention, reservoir 832 is configured to slide or move vertically with housing assembly 816 and tube 826 described subsequently. It should be understood that reservoir 832 slides because the floating cap 812 rises and falls with the rise and fall of upper surface 814 of juice 810 in vat 802 due to the fermentation process. In another embodiment of the invention, portions of the volume of vat 802 which are not occupied by fluid 810 is provided with argon to prevent environmental gases such as air reacting with juice 810.

Still referring to FIG. 1, an exemplary filter and spacer screens 432 and 830 have aligned openings that are aligned with the opening of reservoir 832 and are aligned with the first aperture 828 of housing assembly 816. These aligned openings receive a hollow cylinder, for example, tube 826 that is secured to either one or both of reservoir 832 and housing assembly 816. Tube 826 provides fluid communication between reservoir 832 and vat 802 wherein a first end 838 opens in the inner volume of reservoir 832 and a second end 840 opens to the inside volume of vat 802. In one exemplary embodiment of the invention, tube 826 is extendible to allow selective positioning of second end 840 at selected vertical positions within vat 802 and selected depths within grape juice 810. An exemplary adjustable tube 826 is configured having a first tubular portion 842 having an inner diameter and a second tubular portion 844 having an outer diameter that is smaller than the inner diameter which allows for sliding movement of second tubular portion 844 within the first tubular portion 842. First tubular portion 842 is secured to at least one of the screen 830, the housing assembly 816, and/or the reservoir 832. The exemplary adjustable tube 826 provides the capability of putting juice 833 from reservoir 832 at different selectable depths within vat 802.

Still referring to FIG. 1, a first conduit 846 is provided over the second aperture 824 of housing assembly 816 and extends to a pump 848. First conduit 846 provides fluid communication from the inside volume of vat 802 through the cap 812 and the screen 830, and to pump 848. An exemplary pump 848 comprises a suction pump capable of moving fluids, including gases and liquids, between vat 802 and reservoir 832. For one exemplary embodiment, pump 848 has the capacity to create a psi vacuum ranging from about 0.5 psi vacuum to about 15 psi vacuum, with an example being about 10 psi vacuum. A second conduit 850 extends between, and provides fluid communication between, pump 848 and reservoir 832. It should be understood that any portion of juice 833 can be a foamy froth of gases 422 formed from the fermentation process and juice being fermented wherein gases 422 can escape from reservoir 832 through orifice 836. Moreover, liquid portions of juice 833 exits reservoir 832 by entering first end 838 of tube 826, passing through tube 826, and exiting tube 826 by passing through second end 840 along direction 402 to enter vat 802.

Still referring to FIG. 1, fermentation system 800 can include a plurality of various sensors, probes and modulators provided at various locations relative vat 802. Moreover, the various sensors, probes and modulators will detect and sense various parameters such as temperature, chemistry compositions, and other properties important to the fermentation process, including fluid flow rate and gas concentration. For example, each one of a pair of pressure sensors 410 and 412 is located on opposite sides of a filter 414 in first conduit 846. Pressure sensors 410 and 412 will indicate if filter 414 is blocked or clogged with solid components or debris from cap 812 to protect pump 848. The sensor information from pressure sensors 410 and 412, and filter 414 is provided through various communication pathways 416, 418 and 420 to a processor 860 to implement control of various other devices in fermentation system 800. An exemplary device being controlled by sensor information from pressure sensors 410 and 412, and filter 414 is pump 848 via communication line 426 from processor 860 to modify, regulate and/or control the pumping rate of pump 848. It should be understood that processor 848 can be a mechanical processor such as a temperature or pressure controller, and alternatively, processor 848 can be an electrical processor such as digital signal processor used in computers, and any combination of the two designs.

Still referring to FIG. 1, fermentation system 800 comprises various embodiments of the invention for positioning of probes. One exemplary embodiment comprises a first probe 854 positioned in a lower section of vat 802, a second probe 856 positioned in a section of vat 802 that is below and proximate housing assembly 816 and cap 812, and a third probe 858 positioned through housing assembly 816. First, second and third probes 854, 856 and 858 communicate with processor 860 through respective pathways 407 and 408. In one of various embodiments of the invention, probes 854, 856 and 858 are adjustable in the positional context along the axis of the respective probe. For example, probe 854 can extend to be positioned proximate the second tubular portion 844 of tube 826 and to take measurements at that location. Moreover, probe 854 can be adjusted or moved to be positioned incrementally from second tubular portion 844 to proximate sidewall 806. Accordingly, the capability exists for probe 854 to take parameter measurements of juice 810 for a distance ranging from the second tubular portion 844 to sidewall 806. It should be understood that probes 856 and 858 can be adjusted axially and take parameter measurements along the entire range of axial movement. Furthermore, the capability to axially adjust the probes allows the ability to move the probes out of the way of the moving housing assembly 816 and cap 812 as the volume of juice 810 changes during the fermentation process.

It should be further understood that during the fermentation process, probes 854 and 856 extend into juice 810, and probe 858 extends into cap 812. Additionally, it should be understood that each probe includes a pathway in communication with pump 848. information from each probe is provided to pump 848 and used to regulate and modify the pumping rate of pump 848, including discontinuing the pumping action of pump 848. The information and regulation of the pumping rate of pump 848 is used to facilitate the fermentation process for developing a high-quality final product, such as quality wine. Still further, it should be understood that cap 812 can have a thickness (defined along the vertical axis) ranging from less than an inch to several feet in thickness, for example, greater than 6 feet. Moreover, it should be understood that in various exemplary embodiments of housing assembly 816, housing assembly 816 does not fully enclose cap 812. That is, in various other embodiments of the invention, housing assembly 816 covers or encloses only a portion of the total volume of cap 812, and that portion includes any percentage of the total volume of cap 812. Alternatively, it should be understood that for other various exemplary embodiments, housing assembly 816 encloses the top and sides of cap 812.

Still referring to FIG. 1, fermentation system 800 comprises a heating and cooling apparatus 424 to heat, and alternatively cool, the contents of vat 802, for example, juice 810. An exemplary heating and cooling apparatus 424 is coupled to processor 860 via pathway 426 and coupled to vat 802 via pathway 428. In one of various embodiments according to the invention, an exemplary heating cooling apparatus is one of the various embodiments of thermal regulating systems disclosed by published U.S. patent application, publication no. 20050274499, published on Dec. 15, 2005, Ser. No. 857,530 filed on May 29, 2004, inventor named David D. Rule, the entire disclosure of which is incorporated herein by reference. All the disclosure directed to thermal regulating systems is applicable as an exemplary heating and cooling apparatus 424 and can be used in combination with the following described embodiments of the invention.

In other of various embodiments of the invention, an exemplary heating and cooling apparatus 424 comprises a fluid jacket to be positioned over any surface area of the vat 802. Exemplary fluid jackets include air and liquid jackets with an exemplary fluid jacket being a glycol jacket. An exemplary embodiment of the jackets can cover any percentage of area of sidewall 806 for vat 802. Moreover, additional exemplary embodiments of jackets can be implemented that do not cover an entirety of sidewall 806 wherein the jacket is provided over any portion of sidewall 806 for vat 802, for example, covering the lower 30% of area for sidewall 806 of vat 802. In still other of various embodiments of the invention, an exemplary heating and cooling apparatus 424 is discrete from vat 802 and located any desired distance from vat 802. For this exemplary embodiment, portions of juice 810 are removed from vat 802 to be placed in fluid communication with heating and cooling apparatus 424. The removed portions of juice 810 are cooled, or heated, and after the removed portions of juice 810 reach a selected temperature, the removed portions of juice 810 are returned to vat 802 at selectively strategic levels.

For one of various embodiments of fermentation system 800, processor 860 comprises a digital signal processor and is coupled to all electrical circuitry, communication pathways, devices, probes, sensor, apparatuses and components of fermentation system 800. It should be understood that devices include electrical devices and mechanical devices, including pneumatic devices and hydraulic devices, and any combination of the different devices. Moreover, the electrical circuitry, communication pathways, devices, probes, sensor, apparatuses and components can be remotely interrogated through various communication protocols, for example, TCP-IP data transfer, RS-485 and USB. Additionally, the extracted probe data and information can be further post-processed by a standard desktop or laptop computer using custom software.

Referring to FIG. 2, another one of the various exemplary embodiments of the invention directed to a fermentation system 900 is illustrated and described. It should be understood that any additional structure described with respect to fermentation system 900, which was not disclosed for the previously-described fermentation system 800, can be included in the fermentation system 800, and visa versa. Moreover, the same structures between respective embodiments will only be described thoroughly once and is to be understood to be representative of all embodiments.

Fermentation system 900 comprises a tank 901 to hold a material 903 to be fermented, for example, grape juice 903. In one embodiment, tank 901 comprises a sidewall 949 that terminates to form an open top 909. One exemplary embodiment of the invention includes the sidewall 949 having a sensor 913 that detects the location and upper surfaces of selected components within tank 901, for example, an upper surface 904 of juice 903. An exemplary sensor 913 is electrically coupled to processor 948 by, for example, pathway 936. An exemplary sidewall 949 further includes a man-way access 914 and a clean-out access 915. The horizontal cross-sectional configuration of tank 901 can have any configuration imaginable, for example, a square, a rectangle, a hexagon, an octagon, an oval, a trapezoid, a parallelogram, and any other configuration devoid of symmetry. In one embodiment of the invention, the horizontal cross-sectional configuration of tank 901 includes a circle wherein sidewall 806 is configured as a cylinder.

Still referring to FIG. 2, in one exemplary embodiment of the invention, grape juice 903 will include a cap 905 during the fermentation process. In one of various embodiments of the invention, fermentation system 900 comprises an apparatus or device referenced as housing assembly 902. In one exemplary embodiment of the invention, housing assembly 902 is configured for sliding engagement, vertically, within tank 901 while remaining over cap 905 wherein cap 905 is substantially surrounded having a bottom surface 472. An exemplary housing assembly 902 has a top surface 464 and an open bottom periphery 466. Housing assembly 902 has a first permeable membrane 906 over a second permeable membrane 907. First and second permeable membranes 906 and 907 can be configured as spacer screen 860 and filter screen 432, respectively, of fermentation system 800 of FIG. 1.

Still referring to FIG. 2, fermentation system 901 comprises a reservoir 926. In one of various embodiments of the invention, an exemplary reservoir 926 is positioned remotely from tank 901. An exemplary reservoir 926 can be supported at ground level or any position elevationally above ground level, even elevationally above tank 901. It should be understood that reservoir 926 being positioned at or above the upper surface 904 of juice 903 will facilitate reservoir 926 from overflowing with juice 944 (of juice 903) during the fermentation process. Moreover, it should be understood that as reservoir 926 is positioned elevationally higher and higher, such positioning makes pump 940 of system 900 to be more optional, to be more thoroughly discussed subsequently. It should be understood that housing assembly 902 slides vertically due to the floating cap 905 rising and falling with the rise and fall of upper surface 904 of juice 903 due to and during the fermentation process.

Still referring to FIG. 2, a conduit 910 provides fluid communication between housing assembly 902 and pump 912. An exemplary conduit 910 has a filter 911 and pressure sensors 478 and 480 in conduit 910 of opposite sides of filter 911. Pressure sensors 478 and 480 communicate with processor 948 via pathways 936, 482, 484 and 935. An exemplary pump 912 comprises a double-diaphragm (or double-throw), air-driven suction pump 912 having a first diaphragm 920 and a second diaphragm 921. Conduit 910 is provided having an additional length to allow the capability of maintaining fluid communication with housing assembly 902 as the floating cap 905 rises and falls with juice 903 during the fermentation process. That is, additional length of conduit 910 maintains fluid communication through housing assembly 902, first and second permeable membranes 906 and 907 and cap 905 to juice 903.

Still referring to FIG. 2, a second conduit 922 extends between, and provides fluid communication between, pump 912 and proportioning system 923. Proportioning system 923 inputs and proportions air to pump 912. Pump 912 is in fluid communication with reservoir 926 via conduit 928 wherein a vacuum gauge 946 is in fluid communication with conduit 928 Proportioning system 923 is in communication with processor 948 via pathway 935, is in communication with vacuum gauge 946 via pathway 947, and is in communication with reservoir 926 via pathway 924. Proportioning system 923 comprises additional structures and/or devices which cooperate with reservoir 926 and include sensor devices 925 and float devices 945 to prevent an over-suction event being applied to cap 905. Reservoir 926 is supported by stand 930 and has a gas outlet 486 for exhausting gas 470 along direction 927. Reservoir 926 receives juice 468 from pump 912 and stores or holds as juice 944 which will eventually be returned to juice 903 of tank 901.

Moreover, reservoir 926 is in fluid communication with pump 940 via conduit 929. As reservoir 926 is positioned elevationally higher and higher above juice 903 in tank 901, the purpose for pump 940 is diminished. Reservoir 926 can be positioned high enough to allow gravity to force fluid 944 from reservoir 926 into tank 901 without pump 940. Pump 940 is in fluid communication with heating and cooling apparatus 931 via conduit 938. Heating and cooling apparatus 931 has an inlet 932 to receive heat exchanging fluid 474, for example glycol, and has an outlet 933 to allow heat exchanging fluid 474 to exit heating and cooling apparatus 931. An exemplary inlet 932 includes a flow control device 943. Heating and cooling apparatus 931 is in fluid communication with tank 901 via conduit 987. One exemplary heating and cooling apparatus 931 is in electrical communication with processor 948 via pathway 937. Pump 940 is in electrical communication with processor 948 via pathway 942 and with sensor device 925 of proportioning system 923 via pathway 941. It should be understood that pathways throughout this document can have any combination of a plurality of pathways, including a single pathway from processor 948 with a plurality of extensions of pathways connected with the respective devices and components.

Still referring to FIG. 2, fermentation system 900 can include a plurality of various sensors, probes and modulators provided at various locations relative tank 901. Moreover, the various sensors, probes and modulators will detect and sense various parameters such as temperature, chemistry composition, and other properties important to the fermentation process, including fluid flow rates, various gas concentrations, and various chemistry concentrations. One exemplary probe or sensor according to the invention is a single sensor 908 extending substantially vertically from top of tank 901 through housing assembly 902, through first and second permeable membranes 906 and 907 and through cap 905 to proximate a bottom of tank 901. Single probe 908 can be configured to detect all the parameters, concentrations and chemistries listed throughout this document. Probe 908 can be secured to housing assembly 902, and alternatively is secured to tank 901, and is in electrical communication with processor 948 via pathway 934.

Still referring to FIG. 2, one of various embodiments of fermentation system 900 according to the invention comprises a valve 916 in sidewall 949 of tank 901 to provide fluid communication between conduit 987 and tank 901. An exemplary valve 916 comprises a one-way valve. Another one of various embodiments of fermentation system 900 includes a racking tap 917 and a racking tube 918 in fluid communication with juice 903 in tank 901 and valve 916. Still another exemplary embodiment of fermentation system 900 comprises tank 901 having a drain 919.

Referring to FIG. 3, still another of the various exemplary embodiments of the invention directed to a fermentation system 960 is illustrated and described. It should be understood that any additional structures and components described with respect to fermentation system 960, which were not disclosed for the previously-described fermentation systems 800 and 900, can be included in fermentation systems 800 and 900, and visa versa. Moreover, the same structures between respective embodiments of respective fermentation systems will (or have) only be described thoroughly once and is to be understood to be representative of all disclosed embodiments of the disclosed fermentation systems.

An exemplary fermentation system 960 comprises a container 961 to hold a material 970 to be fermented, for example, grape juice 970. In one exemplary embodiment, container 961 comprises a first portion 966 of a sidewall and a second portion 967 of the sidewall that extends downward from the first portion 966 of container 961. The first portion 966 of container 961 comprises a cylinder having a circular, horizontal cross-section. The first portion 966 of container 961 extends upward from second portion 967 and terminates to form an open top having a peripheral rim 965. The second portion 967 of container 961 comprises a three-dimensional hollow cone with the smallest portion of the cone forming the bottommost section of container 961. The bottommost section of container 961 comprises a valve 968 providing fluid communication between container 961 and an inlet conduit 969.

Still referring to FIG. 3, in one exemplary embodiment of the invention, grape juice 970 includes a cap 866 and gases 971 formed during the fermentation process. The cap 866 comprises at least one of grape skins, grape seeds, grape pulp and grape stems, and can comprise any combination of grape skins, grape seeds, grape pulp and grape stems. In one of various embodiments of the invention, fermentation system 960 comprises an apparatus or device referenced as a permeable structure 962. In one exemplary embodiment of the invention, permeable structure 962 is configured as a hollow cone to be received over at least a portion of cap 866. One of various embodiments of permeable structure 962 has a lower solid portion 964 and an upper permeable portion 963 that extends upwardly from the lower solid portion 964. The upper permeable portion 963 terminates to form an open end 972, and alternatively, can terminate to form a substantial point and being a closed end.

Still referring to FIG. 3, in one exemplary embodiment of the permeable structure 962 according to the invention, lower solid portion 964 is secured to an inside surface of first portion 966 of the sidewall of container 961. An exemplary fermentation system 960 includes a conduit 868 that provides fluid communication between container 961 and a reservoir 981. The lower solid portion 964 of permeable structure 962 is secured to container 961 below conduit 868. With this configuration, when juice 970 is forced from below, and through, cap 866 and through the upper permeable portion 963 of permeable structure 962, the juice 970 will be captured in a cavity 973 formed between lower solid portion 964 of permeable structure 962 and container 961. Since cavity 973 is formed below conduit 868, the juice 970 in cavity 973 will move into reservoir 981 and reside as juice 982.

Still referring to FIG. 3, in one exemplary embodiment of fermentation system 960 has an exemplary heating and cooling apparatus 502 in communication with processor 977 and container 961 via pathways 504 and 510. An exemplary fermentation system 960 has a pressure sensor 508 in communication with container 961 (and fluid 970 therein) and processor 977 via pathway 506. Fermentation system 960 includes a temperature probe 974 positioned in cap 866, a temperature probe 975 positioned below cap 866 and permeable structure 962, and a temperature probe 976 positioned below temperature probe 975. Probes 974, 975 and 976 are electrically coupled to a processor 977 by respective pathways 978, 979 and 980. It should be understood that all electrical components are electrically coupled to processor 977 by circuits. Pump 984 is in electrical communication with processor 977 via pathway 985.

In an exemplary embodiment of fermentation system 960, a conduit 983 provides fluid communication between reservoir 981 and the container 961 through second portion 967 of the sidewall. A pump 984 is in fluid communication with conduit 983 and can be placed anywhere in conduit 983, including inside reservoir 981. Conduit 983 terminates inside container 961 to form a funnel 864. Pump 984 provides the capability to pump juice 982 from reservoir 981 to container 961 and force juice 970 up through cap 866 and through permeable structure 962.

Referring to FIGS. 4 and 5, an exemplary one of the various embodiments for an housing assembly 880 is illustrated and described. It should be understood that housing assembly 880 is similar to housing assembly 902 of system 900 of FIG. 2 and is similar to housing assembly 816 of system 800 of FIG. 1. Furthermore, it should be understood that housing assembly 880 can be used in any one of the fermentation systems disclosed in this document. For this exemplary embodiment, housing assembly 880 comprises an upper surface 882 received over first and second discrete permeable membranes 885 and 886. Housing assembly 880 comprises a cylindrical sidewall 889 extending from upper surface 882 to an open bottom or rim 490 to be received over a cap. Configurations of first and second discrete permeable membranes 885 and 886 have been previously described relative systems 800 and 900 of FIGS. 1 and 2. An exemplary housing assembly 880 includes a suction or vacuum conduit 881 secured through upper surface 882 over the first and second discrete permeable membranes 885 and 886. Suction conduit 881 is configured as a hollow cylinder to provide fluid communication between an exemplary pump and an exemplary fluid in an exemplary vat. A plurality of fasteners 883 such as screws provide connecting support of first and second discrete permeable membranes 885 and 886 to housing assembly 880. It should be understood that housing assembly 880 can comprise any number of a plurality of discrete permeable membranes, including only a single permeable membrane. Additionally, housing assembly 880 includes a flexible seal 884 secured to and surrounding an outer periphery of sidewall 889 and can be located at any position along the vertical dimension of sidewall 889.

Referring to FIGS. 6 and 6A, another of the various embodiments for an exemplary permeable structure 890 is illustrated and described. For this exemplary embodiment, permeable structure 890 is shown in fermentation system 960 of FIGS. 3 and 8-19. Permeable structure 890 is configured as a hollow cone to be received over at least a portion of an exemplary cap. One of various embodiments of permeable structure 890 has a lower solid portion 891 and an upper permeable portion 892 that extends upwardly from the lower solid portion 891. An exemplary lower solid portion 891 comprises at least one of a metal composition, a plastic composition, and/or any other material that is substantially impervious to a liquid, or any combination of the various compositions. An exemplary upper permeable portion 892 comprises at least one of a metal composition, a plastic composition, and/or any combination of materials. The upper permeable portion 892 terminates to form an upper open end 893, and alternatively, can terminate to form substantially a point and being a closed end. An exemplary lower solid portion 891 comprises a bottom open end 894 opposite the upper open end 893. An exemplary bottom end 894 comprises a diameter that is substantially greater than a diameter of the upper open end 893. Fig. A illustrates the upper permeable portion 892 comprises a mesh structure with openings configured as squares. It should be understood that upper permeable portion 892 can comprise a mesh structure with openings having any configuration, for example, circles, rectangles, ovals and any asymmetric design.

Referring to FIG. 7, one of various embodiments of an exemplary fermentation system 950 is illustrated and described. Fermentation system 950 includes a vessel 951 having a conical permeable structure 952. Vessel 951 has a juice 996 to be fermented wherein juice 996 has an upper surface 997. An exemplary conical permeable structure 952 has an upper permeable mesh 953 and a solid portion 954 that extends downwardly from the upper permeable mesh 953. An exemplary vessel 951 comprises at least one auger, and can include a plurality of augers, for example, augers 955 and 988. An exemplary first auger 955 comprises a shaft 956 that extends substantially vertically from an upper opening of vessel 951 to a lower opening of vessel 951. The exemplary lower portion of shaft 956 comprises helical blades 957 extending outward from shaft 956. An exemplary second auger 988 comprises a shaft 989 that extends from the upper opening of vessel 951 and at an angle relative the vertically extending first auger 955. The second auger 988 extends at the angle substantially along an inside surface of conical permeable structure 952. An exemplary second auger 988 comprises helical blades 990 extending outwardly from shaft 989 along substantially an entirety of a length of shaft 989.

Still referring to FIG. 7, an exemplary fermentation system 950 includes an electric gear or motor 958 having a drive shaft 991 to provide rotational power to the first and second augers 955 and 988. An exemplary electric motor 958 is mechanically coupled to the first and second augers 955 and 988 via a plurality of chain and sprocket combinations 992, 993, 994 and 995. Electric power is provided to electric motor 958 to activate electric motor 958 which drives the first and second augers 955 and 988 to break-up the compactness of the solid components of an exemplary cap. It should be understood that second auger 988 can be configured to rotate along substantially an inside surface of conical permeable structure 952. That is, second auger 988 can be configured to rotate forming a conical path.

Before we discuss the inventive methods of using the inventive fermentation systems described above, additional problems with conventional methods and systems must be discussed which are not known in the industry. Conventional wisdom in the industry is that during fermentation, generally only the temperature of grape juice below the cap needs to be monitored. Accordingly, routinely a single sensor or probe is placed below the cap for monitoring of temperature of the juice. The industry assumes that temperatures throughout the juice or liquid volume are uniform or at least within an acceptable temperature range. Accordingly, as long as the single probe is reading a temperature within an acceptable range, the industry assumes that the processing of the juice is progressing as planned.

However, the industry is completely unaware that a plurality of regions or strata in the juice develop their own temperatures independent of what is occurring at the one strata or region below the cap. Moreover, the industry is unaware that temperature and nourishment of the cap (nourishment with juice) for fermentation are the more important factors to control to facilitate the development of a quality final product. In fact, the juice region below the cap can be registering an acceptable temperature while the cap is at a temperature completely outside the range for fermentation. That is, the fermentation at the cap can cease while the single probe indicates fermentation is progressing as planned. The cap is where all the beneficial components are located and need to be transferred into the juice to form the final product with quality. However, if the fermentation in the cap ceases, it is not a simple matter of restarting the fermentation process as the yeast can start to die wherein a different chemistry begins which is detrimental to the final product. Accordingly, the temperature at the cap needs to be stringently monitored and controlled to facilitate quality.

Furthermore, the industry is completely unaware of how quickly and how drastic the temperature in the cap can change. The temperature of the juice in the cap (and the cap) can spike from a temperature range of about 1° F. to about 20° F. outside the fermentation temperature, and this can occur in at time span of about 1.5 hours to about 3 hours (and quicker if environmental factors are more drastically different from the desired temperature of the juice). In the meantime, the single probe measuring temperatures of the region of the juice below the cap is registering an acceptable temperature for fermentation, and the industry thinks the fermentation is progressing as desired.

Parameter control of the cap means the invention is capable of manipulating the temperature, nourishment and exhaustment of gases from the cap which is most conducive to extracting the chemical properties and components from the solid components in the cap. Furthermore, the rate and quantity of extracting beneficial components from the cap into the juice is selectively controlled by controlling the flow rate, quantity, and temperature of the juice being moved into the cap. Exemplary beneficial components include sugar, enzymes, alcohol, phenols, polyphenols or polymeric phenols, acids and tannins. Moreover, pumping juice from bottom of the cap to move up through the cap facilitates the removal of gas produced in the cap during fermentation. In contradiction, conventional methods of spraying juice over the top of the cap or pumping down from the top of the cap simply drives the gases back down into the juice.

Exemplary embodiments of inventive methods for using the various fermentation systems are described according to various embodiments of the invention. For this discussion, the exemplary fermentation system 960 previously described in FIG. 3 will be used and illustrated in FIGS. 8-19 to correspond will the method of steps described and illustrated in the flow chart shown in FIGS. 20A-20B. It should be understood that the reference numbers used in FIG. 3 will be used to reference the same structures in FIGS. 8-19. It should be further understood that any exemplary fermentation system previously described could be used in the method of steps shown in FIGS. 8-20B.

Referring to FIGS. 8 and 20A, an exemplary method 291 of an exemplary fermentation according to the invention is described. An exemplary step 101 includes begin providing or filling container 961 with juice through conduit 969 and valve 968. It should be understood that conduit 969 is in fluid communication with a source of juice wherein the filling of container 961 is automated by selectively opening valve 968 at a predetermined time. An exemplary juice is grape juice having various solid components 861 of grapes, for example, grape skins and stems. It should be understood that an exemplary juice can be substantially devoid of solid components of grapes. It should be further understood that solid components 861 can form, collectively, any selectable percentage of mass within juice. Juice in container 961 is represented as juice 970. Probe 976 is registering a temperature of about 80° F. for juice 970 while the other probes 975 and 974 are not registering a temperature since they have not come in contact with juice 970.

It should be understood that juice can be provided into container 961 at a pre-selected range of temperatures, for example, from about 40° F. to about 110° F. It should be understood that any number of probes, less than or greater than three probes, can be provided in exemplary fermentation systems. It should be further understood that the probes can be configured to monitor and register any type of parameter of juice 970, for example, physical parameters such as temperature and chemical parameters such as concentration of tannins. Probes 974, 975 and 976 continually monitor the physical and chemical aspects of juice 970 and cap 866. The inventor has determined that fermentation most beneficially occurs in cap 866, and therefore, the more controlled the fermentation process within cap 866, the potential exists to optimize the final product. With the cap 866 being monitored by probe 974, any indication of the temperature of cap 866 moving out of a specific temperature range can be immediately addressed and adjusted. That is, the temperature of cap 866 can be adjusted if the temperature passes a threshold value, wherein an exemplary threshold value is pre-selected as a boundary temperature for optimizing the fermentation process (and therefore, the final product). Temperature adjustment and modification of juice 970 includes providing information from respective probes (for example, of the temperature passing the threshold value) to processor 977 which will coordinate activating pumps and heating and cooling apparatuses to adjust the temperature of any respective region of container 961.

Still referring to FIGS. 8 and 20A, the operating status of pump 984 is inactivated or off, that is, no pumping action exists. The operating status of heating and cooling apparatus is inactivated or off, that is, no thermal energy transfer is occurring relative juice 970 and container 961. It should be understood that even though this exemplary fermentation system 960 does not illustrate a heating and cooling apparatus, one of the previously described heating and cooling apparatuses or thermal regulating systems would be included, for example, heating and cooling apparatus 931 of fermentation system 900 of FIG. 2. As container 961 fills with juice, for one of various exemplary embodiments of the method, reservoir 982 is empty. Solid components 861 routinely float in juice 970 and begin to coagulate to form cap 866 (not shown at this stage of the method) under permeable structure 962.

Referring to FIGS. 9 and 20A, an exemplary step 103 includes continuing to fill container 961 with juice 970 until a selected volume of juice 970 is received. In one exemplary step 103, an exemplary level of juice 970 moves upward from below and through permeable structure 962, particularly through the upper permeable portion 963, to reside in cavity 973. As stated previously, cavity 973 is formed between first portion 966 of the sidewall of container 961 and lower solid portion 964 of permeable structure 962. Cavity 973 is in fluid communication with reservoir 982 through conduit 868 wherein portions of juice 970 move from cavity 973 into reservoir 981 and reside as filtered or cleaned juice 982. That is, juice 982 has been filtered through permeable structure 962 because openings in the upper permeable portion 963 are configured to block or impede solid components 861 in juice 970 from passing permeable structure 962. Accordingly, the solid components 861 are captured by permeable structure 962 to remain beneath permeable structure 962. Juice 970 in cavity 973 and juice 982 in reservoir 981 are substantially devoid of solid components 861, if not entirely devoid of solid components 861. All three probes 978, 979 and 980 now register 80° F. Pump status is off. Heating and cooling apparatus status is off.

It should be understood that for exemplary fermentations systems 800 and 900 of FIGS. 1 and 2, respectively, would have juice at this stage of the method which has not moved into respective reservoirs and would remain beneath respective housing assemblies.

Figure 10:
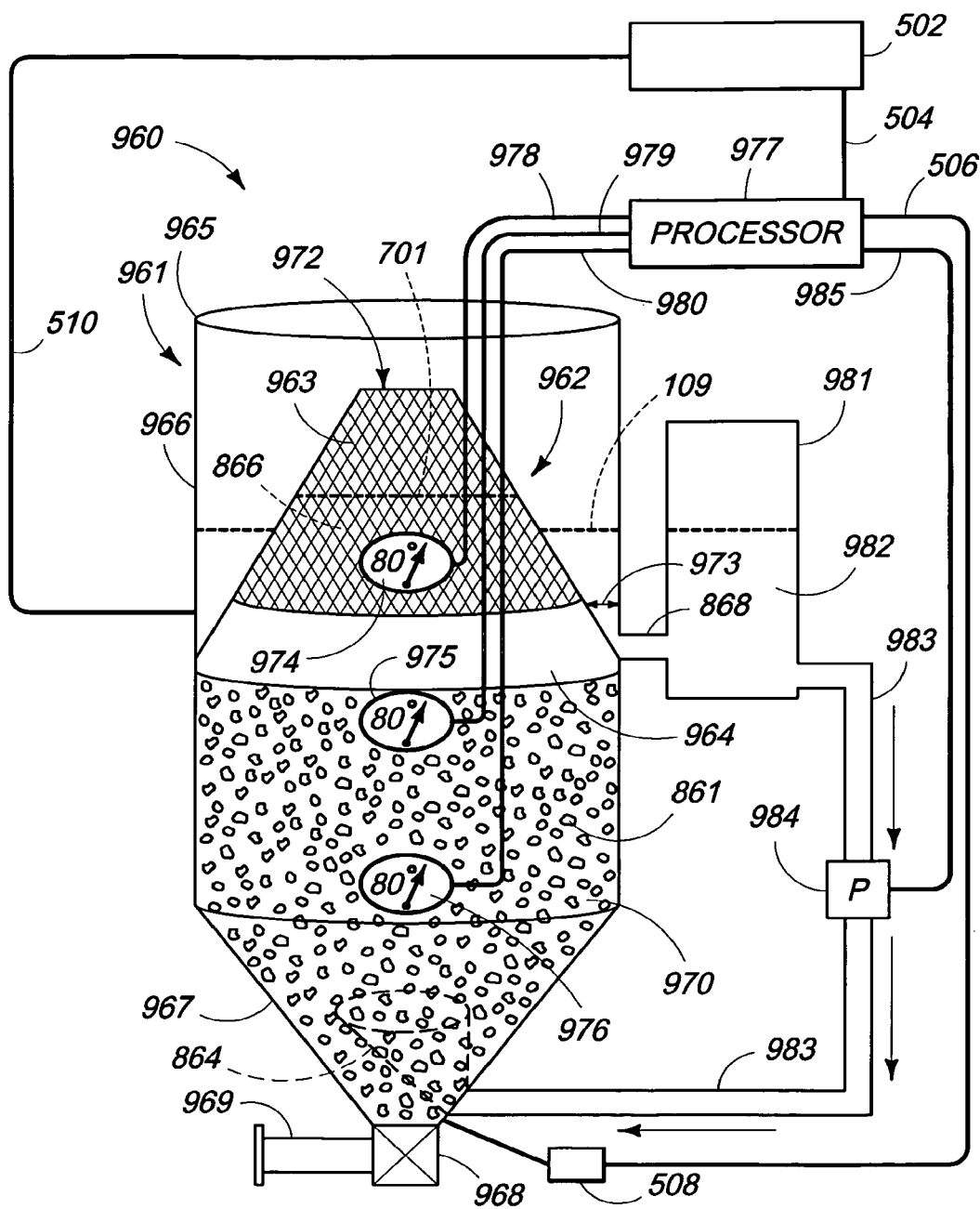
FIG. 10 illustrates an exemplary step subsequent to the FIG. 9 method according to one of various embodiments of the invention.

Referring to FIGS. 10 and 20A, an exemplary step 105 includes sensing the level of juice 970 as it moves upward in container 961 wherein the level corresponds to a known volume of juice 970 in container 961. The sensing is performed by a sensor not shown in fermentation system 960 with an exemplary sensor 913 illustrated in fermentation system 900 of FIG. 2. Once the pre-selected volume of juice 970 is reached, the sensor notifies processor 977 which responds by turning off valve 968 to prevent additional juice from entering container 961. Accordingly, filling container 961 to a desired level and volume is completely automated. Additionally, for one of various embodiments of the method, processor 977 responds by activating pump 984 to start pumping action. The pump action circulates juice through fermentation system 960 and forces or moves juice 970 from below permeable structure 962 to facilitate solid components 861 into permeable structure 962.

In one exemplary method, processor 977 turns off valve 968 and activates pump 984 at substantially the same time. In another exemplary method, processor 977 staggers the timing of turning off valve 968 and activating pump 984. Accordingly, valve 968 can be turned off after starting pump 984, and alternatively, valve 968 can be turned off before starting pump 984. It should be understood that the pumping action of starting pump 984 creates a fluid pressure below the permeable structure 962 that is greater than the fluid pressure above the permeable structure 962. The fluid pressure differential develops an upward movement of the juice in container 961 through permeable structure 962 to reservoir 981. This movement of juice begins the cyclic movement of juice through fermentation system 960.

Referring to FIGS. 10 and 20A, for another one of various embodiments of exemplary step 105, processor 977 activates a heating and cooling apparatus (not illustrated) to establish thermal energy transfer from any portion of juice. In various exemplary embodiments, the thermal energy transfer can occur through any structure of fermentation system 960 including the container 961 and/or the reservoir 981 from or to juice within system 960. In one exemplary method, processor 977 turns off valve 968, starts pump 984, and activates the heating and cooling apparatus at substantially the same time, and alternatively, only two of any of the three operations can be performed simultaneously. In another exemplary method, processor 977 staggers the timing of, in any combination, of turning off valve 968, activating pump 984 and activating the heating and cooling apparatus.

Still referring to FIGS. 10 and 20A and an exemplary step 105, it should be understood that various exemplary methods according to the invention include adjusting or modifying a temperature of a region of juice 970 located at any height elevationally relative the container 961. Any exemplary heating and cooling apparatus can surround structure of system 960 including any portion of the reservoir 981, and/or any portion of container 961, and/or any portion of the conduit 983, and/or any combination thereof. Moreover, the exemplary region of juice 970 being influenced by the temperature adjustment and heating and cooling apparatus can comprise any selected thickness defined in the vertical direction. It should be understood that one of various exemplary methods according to the invention include adjusting or modifying a temperature of an entirety of container 961, and/or the portion of the container 961 that corresponds to an entirety of the vertical dimension of the juice 970 in container 961. Still further, it should be understood that any one of these various methods of adjusting the temperature of container 961 using a heating and cooling apparatus is applicable for each occurrence of using the heating and cooling apparatus in the exemplary embodiments of the methods for utilizing the exemplary fermentation systems described in this document.

Still referring to FIGS. 10 and 20A and an exemplary step 105, it should be understood that turning off valve 968, activating the pump 984 and heating and cooling apparatus, and the timing of each operation is automated by respective sensors and activation being coordinated by processor 977. That is, the mechanical operations are coordinated and automated after information (sensor data) is received and processed by processor 977 making the method of using fermentation system 960 automated. Solid components 861 continue to coagulate and to develop cap 866 under, and inside, permeable structure 962 wherein the pumping action intensifies the coagulation. An exemplary cap 866 develops an upper surface 701 in permeable structure 962 which is elevationally above an upper surface 109 of juice 970. It should be understood that if the thermal energy transfer comprises a cooling of the juice, the pumping action of pump 984 cycles the juice through system 960, and the juice begins to cool down throughout the fermentation system 960.

Figure 11:
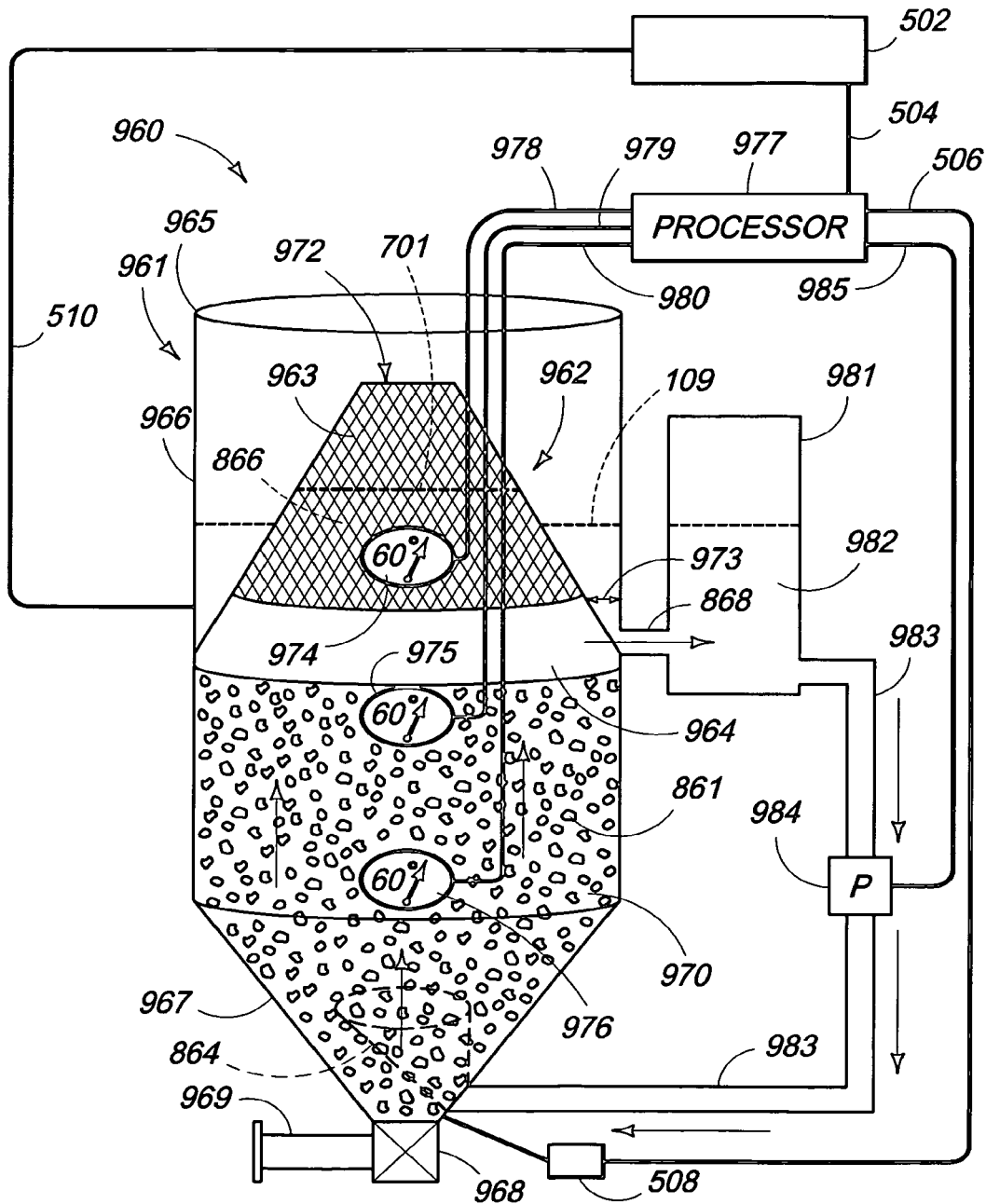
FIG. 11 illustrates an exemplary step subsequent to the FIG. 10 method according to one of various embodiments of the invention.

Referring to FIGS. 11 and 20A, an exemplary step 107 includes continuing the cooling and cycling of juice through fermentation system 960. In one exemplary embodiment of the method, the pump 984 and heating and cooling apparatus are continually activated to continue cycling of juice until a uniform temperature of juice 970 is reached through substantially an entirety of container 961. An exemplary uniform temperature comprises about 60° F. It should be understood that cycling of juice through system 970 moves juice 982 from reservoir 981 and returns juice 982 to container 961 through funnel 864. Since funnel 864 is located at the bottom of container 961, the returning juice through funnel 864 facilitates the fluid pressure differential and movement of juice 970 upward in container 961. The fluid pressure differential communicates throughout fluid 970 upward from funnel 864 toward cap 866 and permeable structure 962. That is, the pressure differential developed above permeable structure 962 and the fluid pressure developed below permeable structure 962 by returning fluid, both created by the pumping action, forces fluid 970 through cap 866, through permeable structure 962, into cavity 973. Juice continues through conduit 868, through reservoir 981, through pump 984 and back into container 961 to complete an exemplary complete cycle of juice through system 960.

It should be understood that any selected parameter, of any selected region of juice in system 960, can be selectively controlled and adjusted by cycling juice through system. The fermentation process is further facilitated by automatically providing, and selectively combining, the selective activation of the heating and cooling apparatus, the selective addition of yeast nutrients and the selective extraction of detrimental components from the juice such as vinegar. It should be further understood that probes 974, 975 and 976 continually sense or detect the various parameters, including temperatures of juice, located at the respective positions of respective probes. The fermentation system 960 has the capability to repeatedly cycle the juice through system 960 for a selected length of time and for a selected number of cycles. It should be understood, since the temperature of any exemplary region of juice can be adjusted or modified, the temperature throughout the container 961 can be selected to be any combination of regions of juice having non-uniform temperatures. Moreover, at this stage of an exemplary method according to the invention, since juice 970 is substantially at an uniform temperature as selected, pump 984 is turned off and system 960 is ready to begin the fermentation process.

It should be understood that at this stage of the method for fermentations systems 800 and 900 of FIGS. 1 and 2, respectively, pumping action is implemented by respective pumps which create pressure differentials above respective housing assemblies. That is, a fluid pressure differential is created relative the respective housing assemblies wherein a fluid pressure develops below respective housing assemblies that is greater than a fluid pressure that develops above the respective housing assemblies. The fluid pressure differential in the juice of respective fermentation systems 800 and 900 moves the juice through respective conduits, through respective pumps and through respective reservoirs to begin the cycling of juice through respective through respective fermentation systems 800 and 900.

Figure 12:
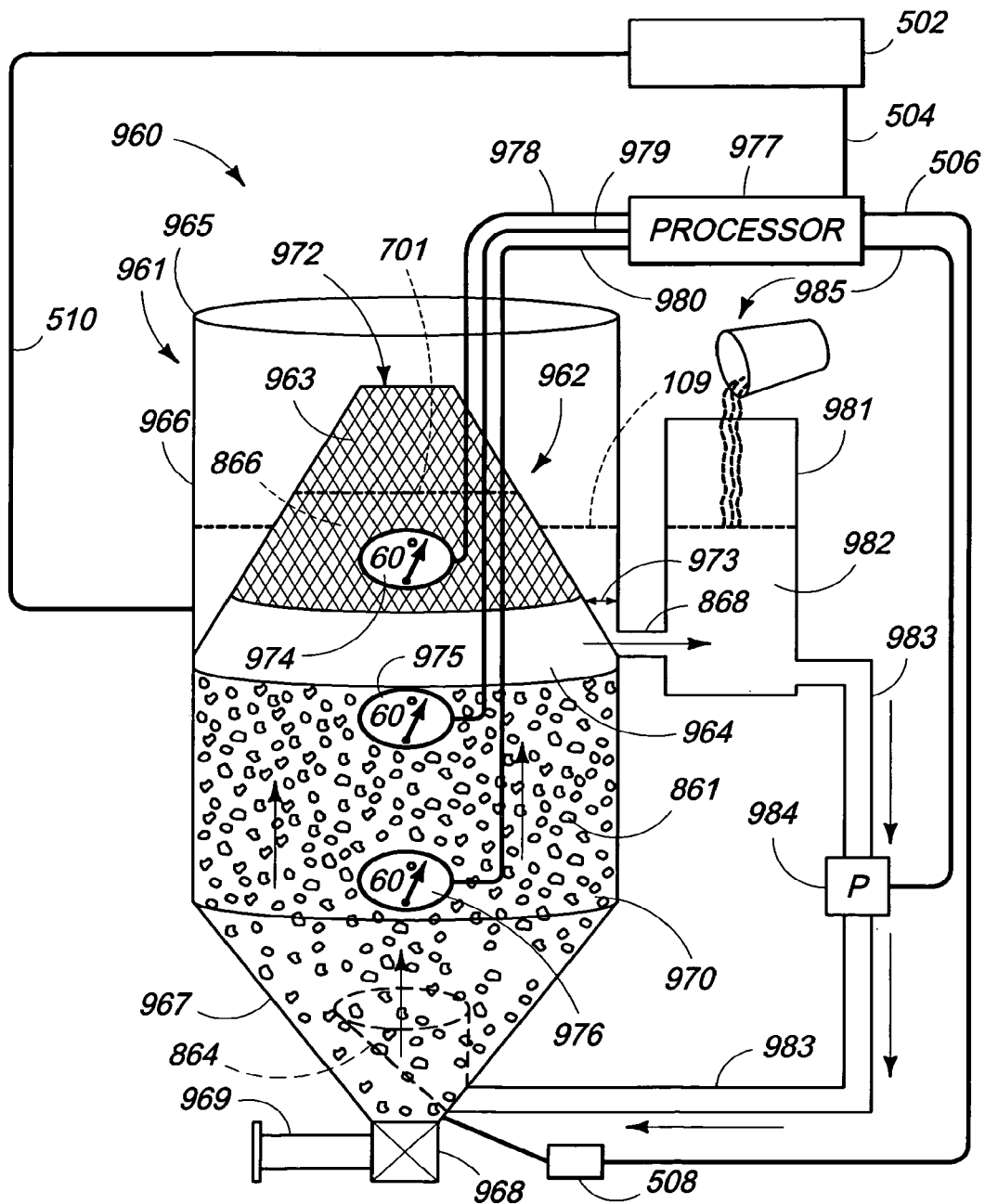
FIG. 12 illustrates an exemplary step subsequent to the FIG. 11 method according to one of various embodiments of the invention.

Referring to FIGS. 12 and 20A, an exemplary step 111 includes, in one of various embodiments of the invention, adding yeast to system 960. For exemplary juices, an exemplary temperature range to optimize fermentation is from about 55° F. to about 75° F. For exemplary juices such as grape juice, such juices inherently contain yeast (and sugar, tannins and acids) for fermentation, and therefore, influencing juice 970 to reach an exemplary fermentation temperature will result in fermentation beginning, that is, without adding yeast. Alternatively, various varieties of yeast can be added to juice of system 960. In various embodiments of the invention, the temperature of juice 970 is modified to reach an acceptable fermentation temperature before or after the addition of yeast. Pumping action by pump 984 is continued in exemplary step 111 to cycle the added yeast through system 960. In one exemplary method according to the invention, yeast is added to juice 982 in reservoir 981. In another exemplary method according to the invention, yeast is added to juice 970 in container 961, and alternatively, yeast is provided to both the container 961 and the reservoir 981. For various exemplary embodiments of the method, any number of steps for adding yeast can be implemented and the adding can occur at any of various places of the fermentation system 960.

Figure 13:
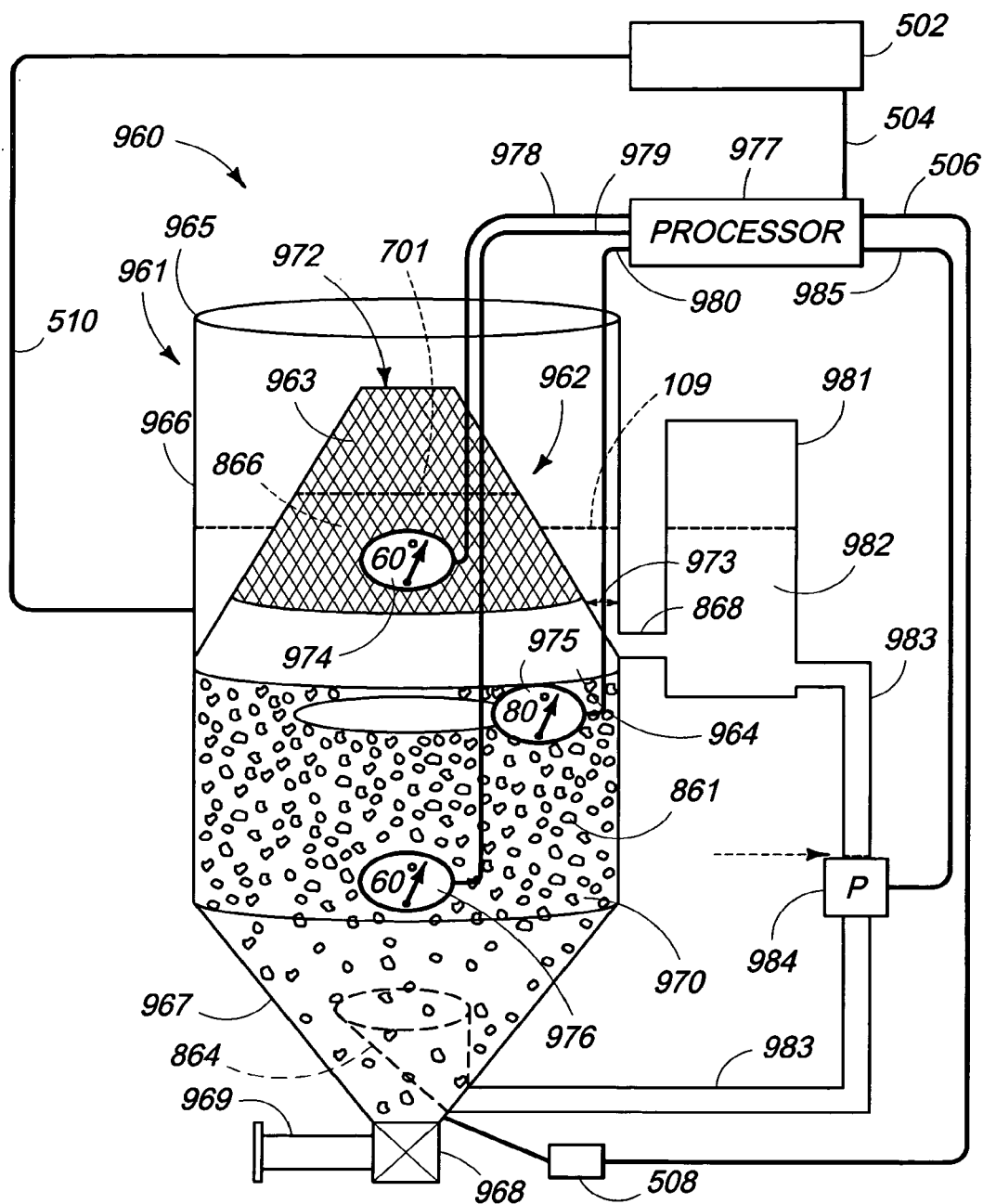
FIG. 13 illustrates an exemplary step subsequent to the FIG. 12 method according to one of various embodiments of the invention.

Referring to FIGS. 13 and 20A, for one exemplary method according to the invention, cap 866 and the juice therein is selected to ferment at a temperature other than 60° F. Accordingly, the temperature of cap 866 and the juice therein is selectively adjusted and modified. Accordingly, an exemplary step 113 includes discontinuing the pumping action by pump 984 and to begin adjusting a temperature of a region of juice 970 below cap 866 and below permeable structure 962. Moreover, the exemplary region of juice 970 selected for temperature adjustment comprises any selected thickness defined in the vertical direction. It should be understood that one of various exemplary methods according to the invention include adjusting or modifying a temperature of an entirety of container 961, and/or the portion of the container 961 that corresponds to an entirety of the vertical dimension of the juice 970 in container 961.

Still referring to FIGS. 13 and 20A and exemplary step 113, an exemplary heating and cooling apparatus comprises a structure secured around a portion of container 961. The exemplary portion of container 961 covered by the exemplary heating and cooling apparatus is located at a height position of the container 961 that corresponds to the region of juice 970 located below cap 866 and below permeable structure 962. Thermal energy, which in this step is heat, is transferred into container 961 at the height position relative the container 961 that corresponds to the region of juice 970 located below cap 866 and permeable structure 962. One exemplary configuration of a heating and cooling apparatus is a glycol jacket that is positioned over a percentage of surface area of the first portion 966 of the sidewall of container 961 wherein the glycol jacket is located elevationally level with the region of juice 970 which is located below cap 866 and permeable structure 962. Thermal energy is continually applied and transferred as heat into container 961 and into the region of juice 970 located below cap 866 until probe 974 registers a selected temperature. In one exemplary embodiment of the method, the juice 970 located below cap 866 will be warmed to a selected temperature of about 80° F.

Figure 14:
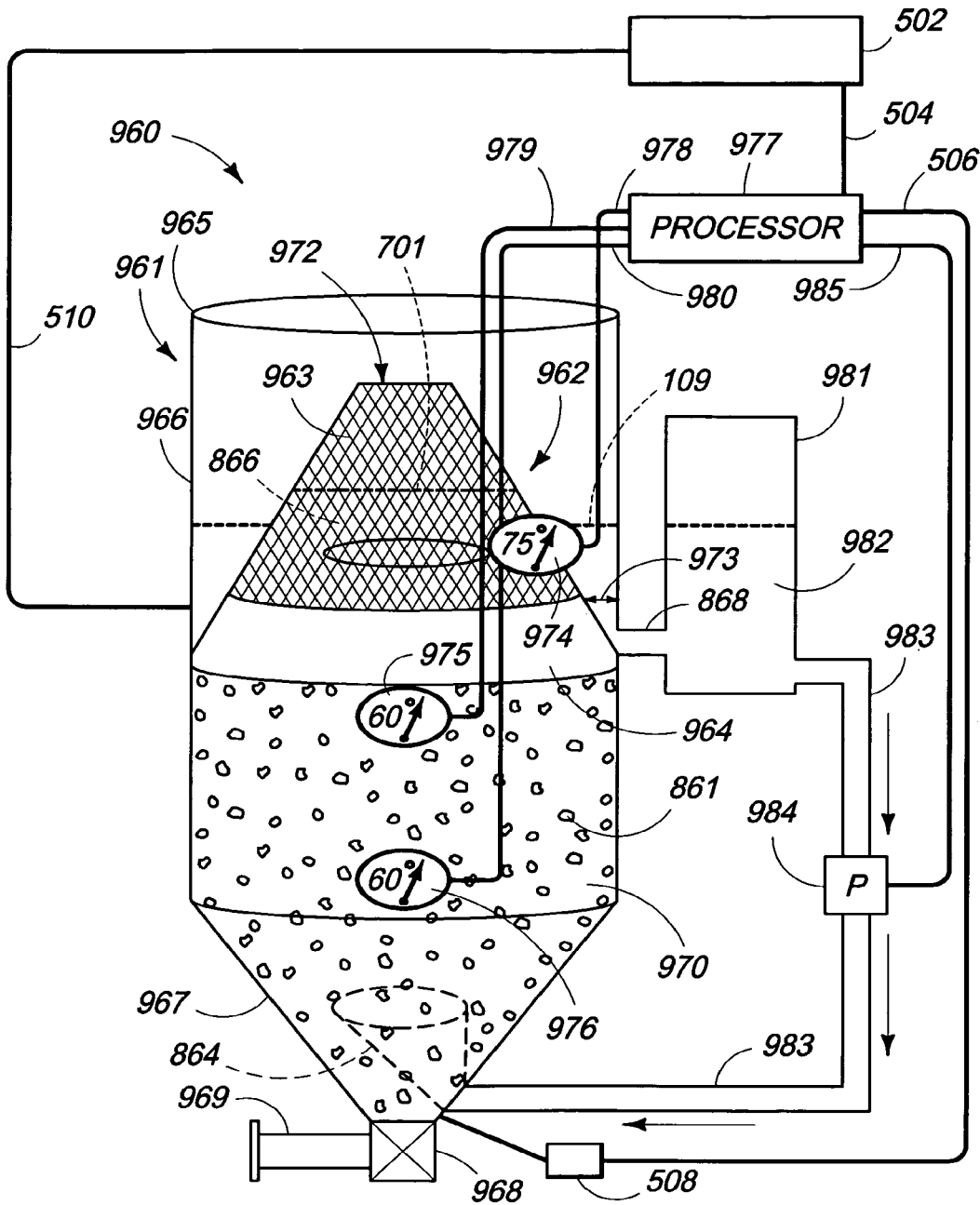
FIG. 14 illustrates an exemplary step subsequent to the FIG. 13 method according to one of various embodiments of the invention.

Referring to FIGS. 14 and 20A, once probe 975 indicates to processor 977 that the selected region of juice is about 80° F., an exemplary step 115 includes processor 977 sending a signal to activate pump 984. Activating pump 984 begins cycling juice through fermentation system 960 to move the warmed juice 970 located below cap 866 upward into cap 866. As the warmed juice 970 moves into cap 866, cap 866 begins increasing in temperature and the juice 970 located below cap 866 begins decreasing in temperature. The cycling of juice continues through system 960 until cap 866 and juice therein reaches a temperature of about 75° F. and the region of juice located at probe 975 is replaced with juice of about 60° F. In this an exemplary step 115, the heating and cooling apparatus and pump 984 continues to operate to increase the temperature of juice at probe 975.

Figure 15:
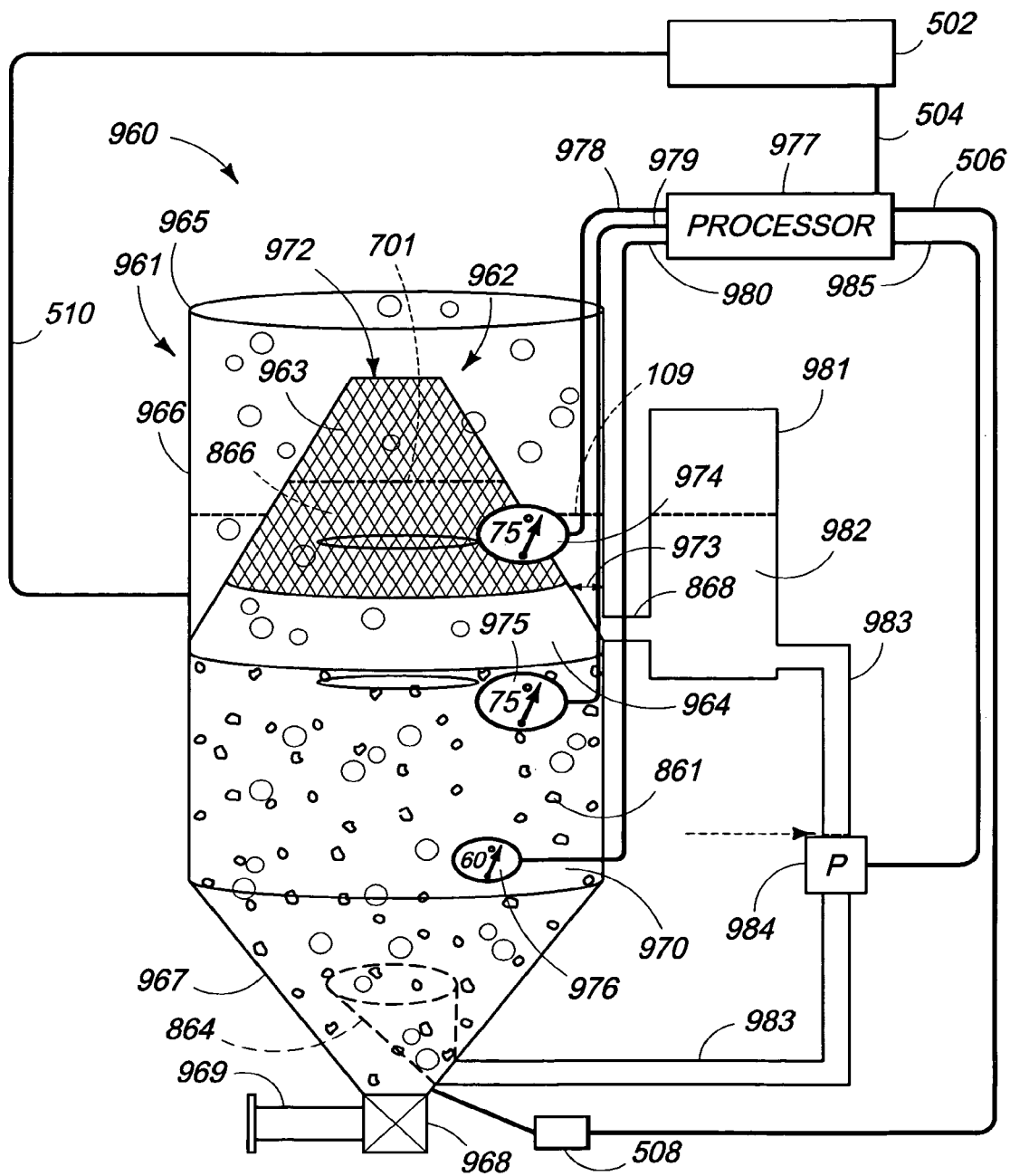
FIG. 15 illustrates an exemplary step subsequent to the FIG. 14 method according to one of various embodiments of the invention.

Referring to FIGS. 15 and 20B, for an exemplary step 119, the cap 866 reaches a temperature of about 75° F. and the temperature of the region of juice located at probe 975 reaches a temperature of about 75° F. Step 119 includes processor 977 deactivating the pump 984 and the heating and cooling apparatus. An exemplary temperature registered by probe 976 is about 60° F. For some exemplary embodiments of the fermentation process, at these exemplary temperatures of the juice 970 in container 961, fermentation is progressing vigorously. Thermal energy as heat is being generated substantially relative previous time periods since the addition of yeast. Additionally, gases are being generated substantially relative previous time periods since the addition of yeast. The gases are able to escape from container 961 through the top 965 to the environment.

At this stage of exemplary methods according to the invention for respective fermentation systems 800 and 900, gases escape respective vats or tanks through respective conduits, through respective pumps, and through respective reservoirs to the environment.

Figure 16:
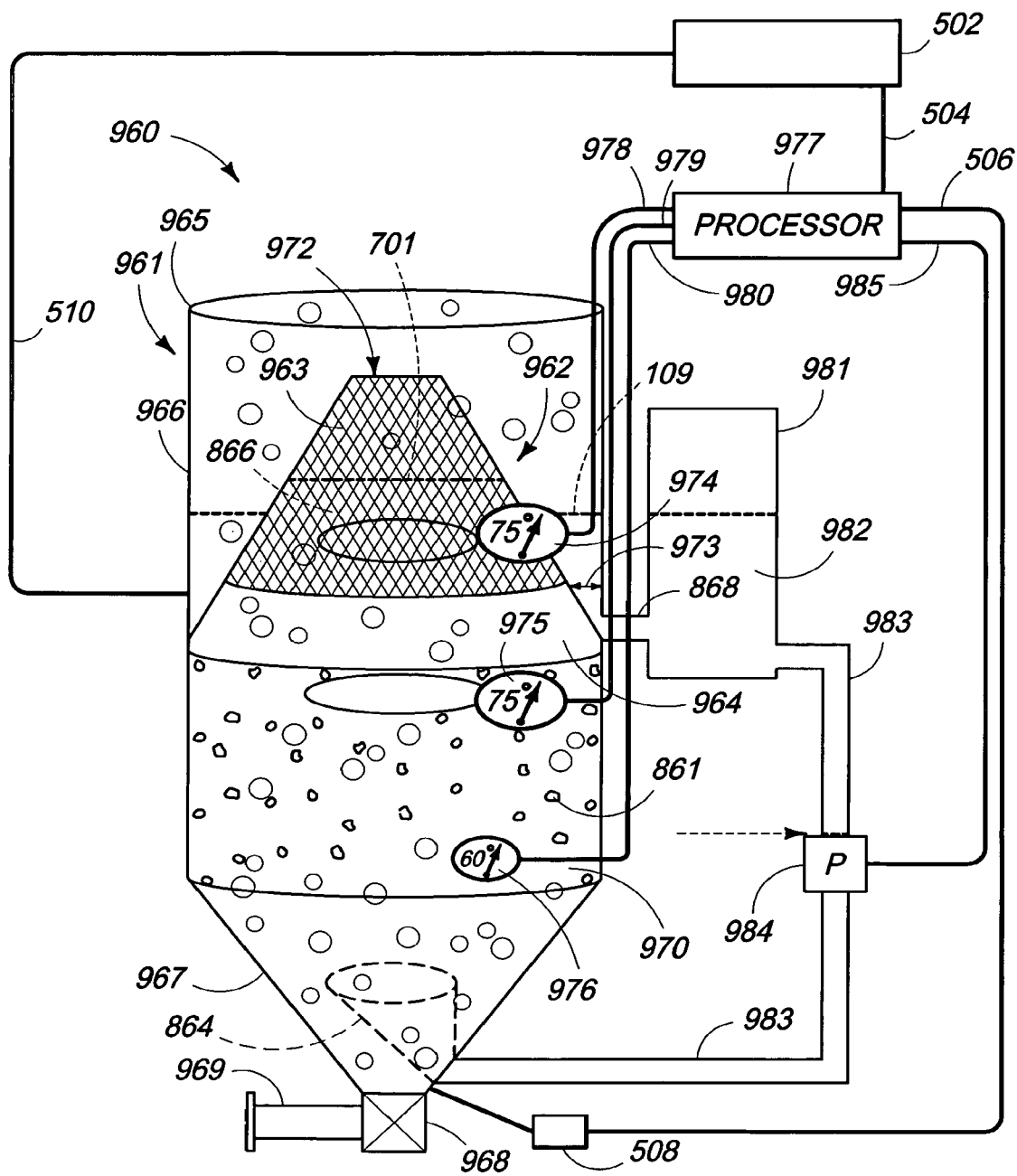
FIG. 16 illustrates an exemplary step subsequent to the FIG. 15 method according to one of various embodiments of the invention.

Referring to FIGS. 16 and 20B, an exemplary step 121 allows fermentation to continue unabated with pump 984 and the heating and cooling apparatus deactivated. The fermentation is still progressing vigorously wherein heat generation is such that the regions of juice 970 proximate probes 974 and 975 which have respective temperatures of about 75° F. are enlarging.

Figure 17:
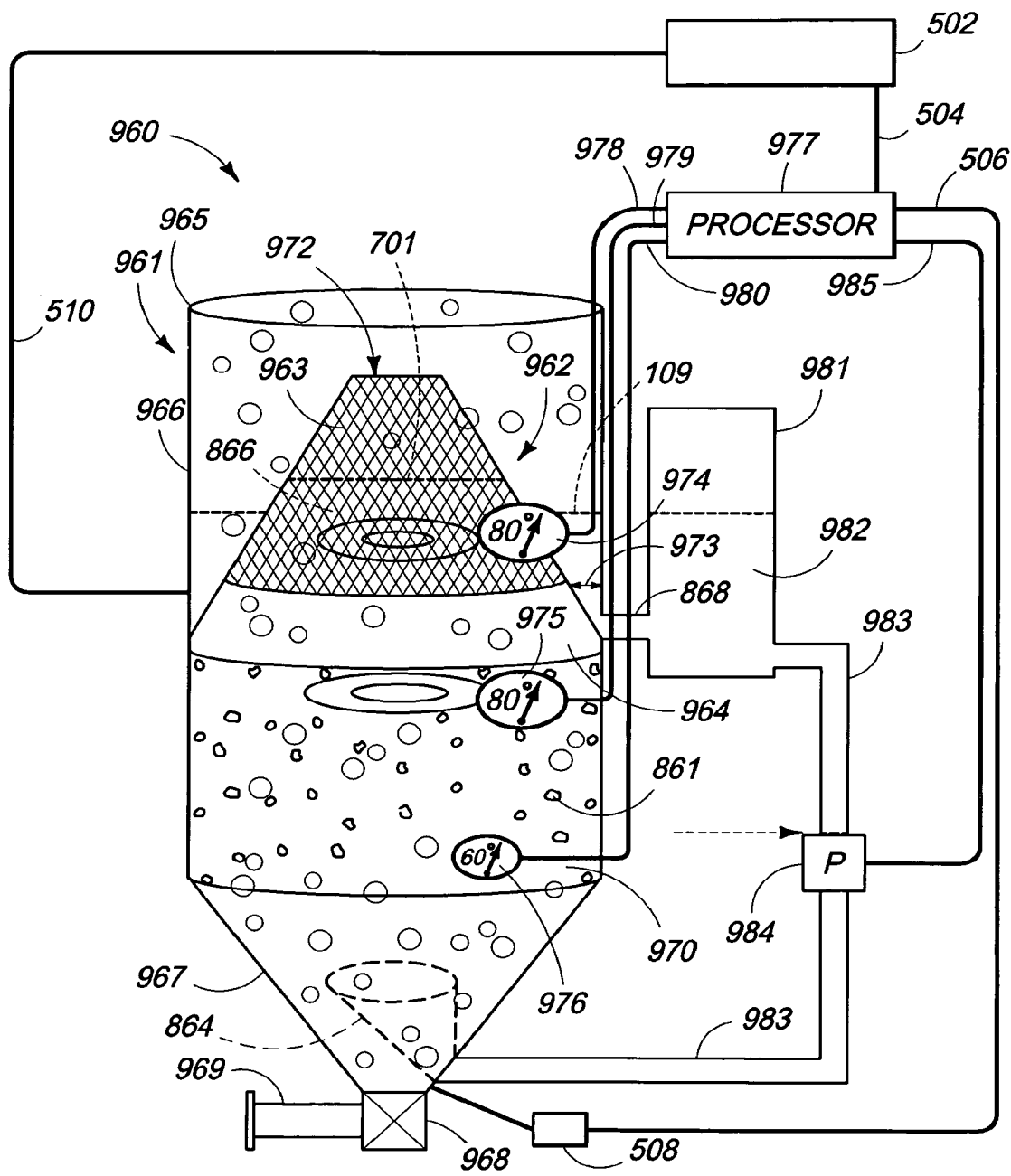
FIG. 17 illustrates an exemplary step subsequent to the FIG. 16 method according to one of various embodiments of the invention.

Referring to FIGS. 17 and 20B, an exemplary step 123 allows fermentation to continue unabated with pump 984 and the heating and cooling apparatus deactivated. The fermentation is still progressing vigorously wherein heat generation is such that the regions of juice 970 proximate probes 974 and 975 have developed into at least two temperature zones, respectively. One temperature zone equals about 80° F. and the other temperature zone equals about 75° F. for each region of juice located proximate respective probes 974 and 975. An exemplary temperature of juice proximate probe 976 registers about 60° F. An exemplary probe 974 capable of detecting the at least two temperature zones in a single region of juice comprises a probe that is capable of detecting a plurality of temperatures at a plurality of different temperature zones in a single specific region of juice. That is, for one of various exemplary embodiments of the probes, each probe comprises two or more sensing devices positioned at different locations or zones within the specific regions of juice 970.

Still referring to FIGS. 17 and 20B and exemplary step 123, one of another of various exemplary embodiments of the probes includes each probe comprises a single sensor capable of moving into a plurality of different locations or zones within the specific regions of juice 970. It should be understood that any one of the exemplary probes, and any combination thereof, can be capable of detecting a plurality of different temperatures located at a plurality of differing zones of a single region of juice 970. A temperature of about 80° F. in cap 866 and juice therein can be selected to be a temperature outside a range for optimizing fermentation, and therefore, can represent a threshold temperature value.

Figure 18:
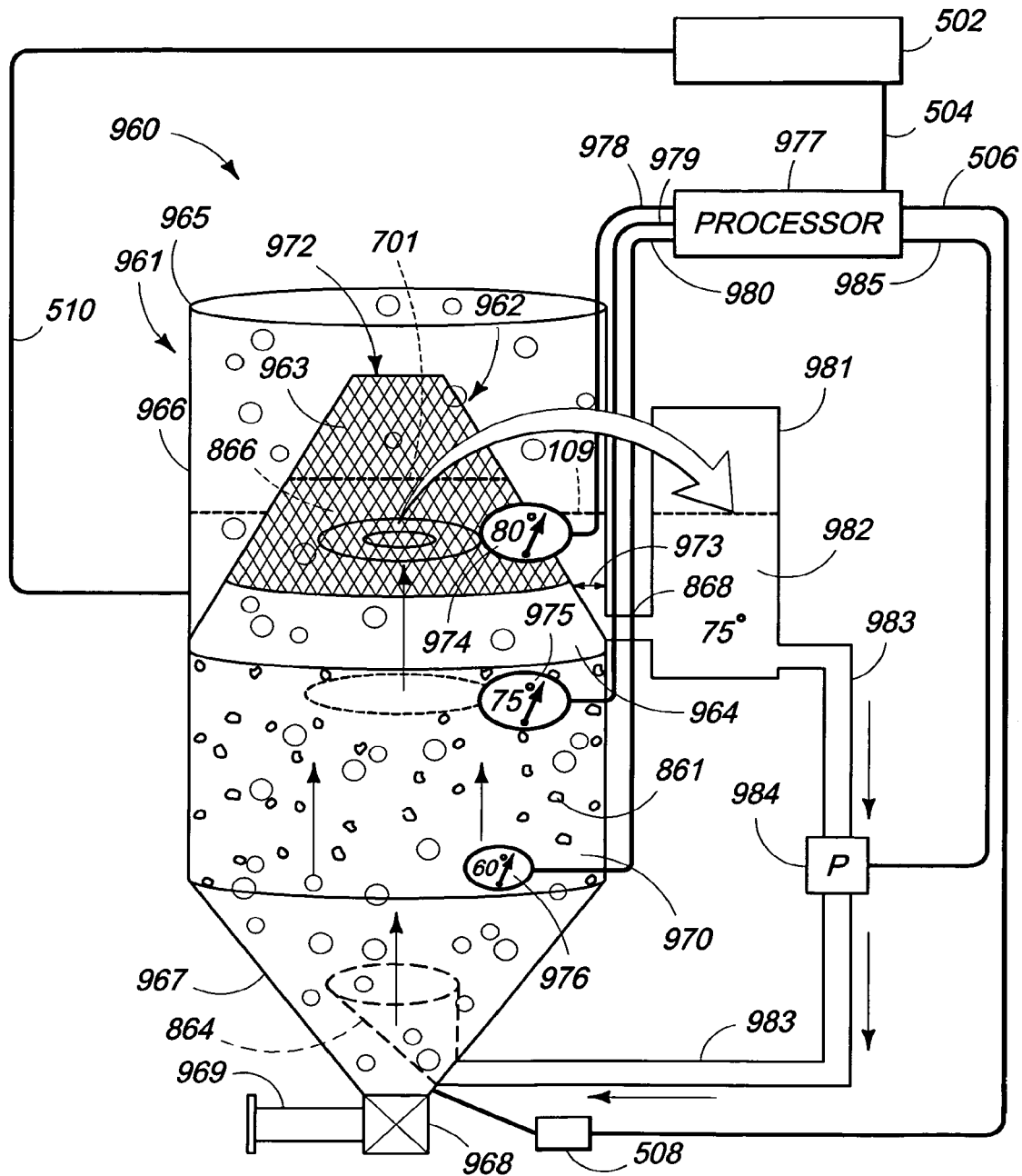
FIG. 18 illustrates an exemplary step subsequent to the FIG. 17 method according to one of various embodiments of the invention.

Referring to FIGS. 18 and 20B, an exemplary step 125 includes detecting a threshold temperature value by at least one of the plurality of probes. In one exemplary step 125, a threshold temperature value is registered by at least probe 974 in cap 866 of about 80° F., and notifying processor 977 to activate at least pump 984 to begin cycling juice 970 through fermentation system 960. Additionally, for another exemplary step 125, the heating and cooling apparatus can be activated for cooling which will increase the speed of adjusting or modifying temperatures of regions of juice in system 970. The cycling of juice in exemplary step 125 moves juice 970 from proximate probe 974 (in cap 866) into reservoir 981 wherein juice 982 reaches a temperature of about 75° F. The cycling of juice in exemplary step 125 moves juice 970 from proximate probe 975 into the region of juice proximate probe 974 wherein this juice proximate probe 974 still has two temperature zones at about 75° F. and 80° F., respectively. However, the region of juice 970 proximate probe 975 is modified to have a single temperature zone of about 75° F. The region of juice proximate probe 976 registers about 60° F. For an exemplary step 125, step 125 includes maintaining the heating and cooling apparatus in the off status.

Still referring to FIGS. 18 and 20B and exemplary step 125, it should be understood that the cycling of juice through system 970 removes or strips gases from the juice and cap 866 which can be detrimental to the fermentation process. It should be understood that the cycling of juice through system 970 removes the beneficial chemical components in solid components 861 of cap 866 to reside in the juice. It should be further understood that any cycling step can provide the benefits of providing the cap 866 and juice 970 at temperatures conductive to fermentation.

Figure 19:
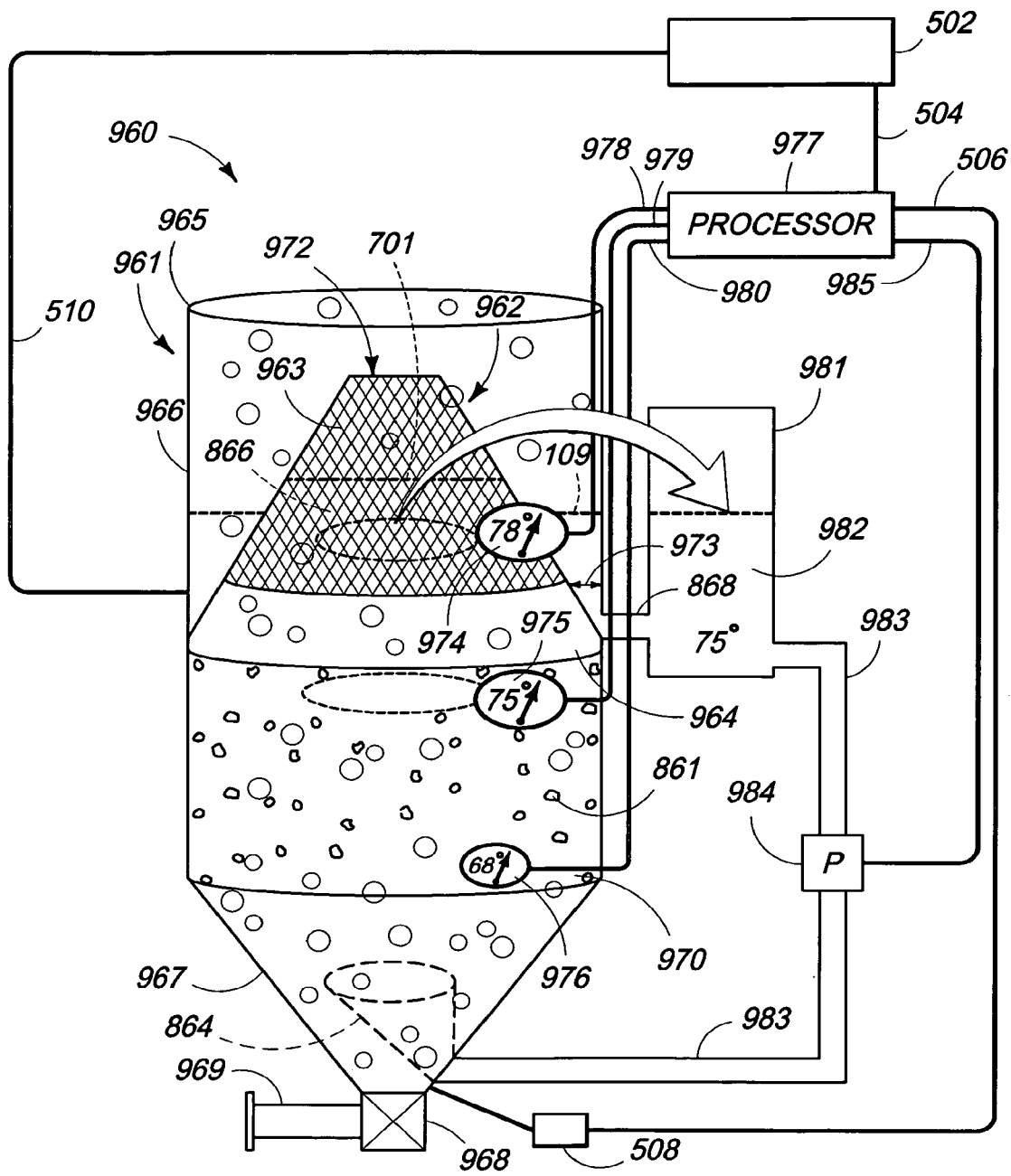
FIG. 19 illustrates an exemplary step subsequent to the FIG. 18 method according to one of various embodiments of the invention.

Referring to FIGS. 19 and 20B, an exemplary step 127 includes allowing the fermentation and pumping action to continue until the region of juice 970 proximate probe 974 registers a single temperature of about 78° F., and the region of juice 970 proximate probe 975 registers a single temperature of about 75° F., and the region of juice 970 proximate probe 976 registers a single temperature of about 68° F. At this exemplary temperature configuration of juice 970 within container 961, an exemplary step 127 includes deactivating pump 984 and allowing the fermentation process to conclude. Eventually, the fermentation process will decrease in vigor until the process substantially ceases. The juice is then processed as desired.

It should be understood that the respective probes of the exemplary fermentation systems will continually monitor respective temperatures of the differing regions of juice 970 within container 961. As the temperatures of regions of juice 970 reach threshold temperature values defined as unacceptable temperatures for optimizing the fermentation process, processor 977 will automatically coordinate activation of pump 984 and heating and cooling apparatus to automatically adjust and modify the temperatures to reach selected and/or acceptable temperature values. It should be understood that parameters other than temperatures of juice 970, such as chemical parameters, can prompt processor 977 to automatically coordinate activation of pump 984 and heating and cooling apparatus which will automatically adjust and modify the chemical parameters of the juice. Accordingly, the exemplary methods of using the exemplary fermentation systems described herein can be configured to be completely automated, and alternatively, configured with any one step to be implemented manually.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:
1. A fermentation method comprising:
   providing a container having grape juice to be fermented, the grape juice comprising a cap, the cap comprising a permeable collection of solid components of grapes;

providing a screen over the cap;

moving a portion of the grape juice from below the cap upward into contact with the lowermost portion of the cap, upward through the cap, out the container, and into a bottom portion of the container; and wherein the screen is floating elevationally above the cap.

2. The method of claim 1 further comprising sensing at least one parameter from the portion of the grape juice.

3. The method of claim 1 further comprising sensing at least one parameter from the portion of the grape juice, and wherein the sensing comprises sensing at least one of temperature, flow rate, gas concentration and chemistry composition.

4. The method of claim 1 further comprising sensing at least one parameter from the cap.

5. The method of claim 1 further comprising sensing at least one parameter from the cap, and wherein the sensing comprises sensing at least one of temperature, flow rate, gas concentration and chemistry composition.

6. The method of claim 1 further comprising pumping gases from the container.

7. The method of claim 1 further comprising maintaining the cap submerged in the grape juice during at least a majority of the time allotted for the fermentation process.

8. The method of claim 1 further comprising providing a temperature probe directly into the cap.

9. The method of claim 1 further comprising permeating the cap with the grape juice.

10. A fermentation method comprising:

providing a container having grape juice to be fermented, the grape juice comprising a cap, the cap comprising a collection of grape components having a permeable consistency and floating in the grape juice;

providing a housing assembly floating over the cap; and creating a vacuum in the cap to move a volume of the grape juice through at least a portion of the cap.

11. The method of claim 10 wherein the creating comprises moving the volume of the grape juice through an entirety of the cap.

12. The method of claim 10 further comprising providing a permeable substrate adjacent the cap, and wherein the creating comprises creating the vacuum through the permeable substrate.

13. The method of claim 10 wherein the volume of the grape juice is moved from elevationally below the cap.

14. The method of claim 10 wherein the creating of the vacuum comprises permeating the cap with the grape juice.

15. The method of claim 10 further comprising maintaining the vacuum during at least a majority of the time allotted for the fermentation process.

* * * * *